(12) United States Patent
Gao et al.

(10) Patent No.: US 11,051,328 B2
(45) Date of Patent: Jun. 29, 2021

(54) METHOD AND DEVICE FOR CROSS-NUMEROLOGY SCHEDULING

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/874,102

(22) Filed: May 14, 2020

(65) Prior Publication Data

US 2020/0275472 A1  Aug. 27, 2020

Related U.S. Application Data

(63) Continuation of application No. 16/619,322, filed as application No. PCT/CN2017/088512 on Jun. 15, 2017.

(51) Int. Cl.
| | |
|---|---|
| *H04B 7/00* | (2006.01) |
| *H04W 72/12* | (2009.01) |
| *H04L 1/18* | (2006.01) |
| *H04L 5/00* | (2006.01) |
| *H04W 72/04* | (2009.01) |
| *H04L 27/26* | (2006.01) |

(52) U.S. Cl.
CPC ....... *H04W 72/1284* (2013.01); *H04L 1/1812* (2013.01); *H04L 5/0007* (2013.01); *H04W 72/0413* (2013.01); *H04L 27/2605* (2013.01); *H04W 72/044* (2013.01)

(58) Field of Classification Search
CPC ... H04W 72/02; H04W 72/04; H04W 72/042; H04W 72/0446; H04W 72/12; H04W 72/1278

USPC ................................. 370/310, 328–330, 345
See application file for complete search history.

(56) References Cited

U.S. PATENT DOCUMENTS

| | | | |
|---|---|---|---|
| 9,584,354 B2 | 2/2017 | Martinez | |
| 10,159,097 B2 * | 12/2018 | Ji | ............ H04L 5/0092 |
| 10,362,593 B2 * | 7/2019 | Salem | ............ H04W 72/1289 |
| 10,484,890 B2 * | 11/2019 | Lin | ...... H04L 27/2602 |
| 10,548,129 B2 * | 1/2020 | Fwu | ...... H04L 5/0037 |
| 10,716,100 B2 * | 7/2020 | Yin | ............ H04W 72/1284 |

(Continued)

FOREIGN PATENT DOCUMENTS

| | | |
|---|---|---|
| CN | 106376050 A | 2/2017 |
| CN | 106507439 A | 3/2017 |

(Continued)

OTHER PUBLICATIONS

3GPP TSG RAN WG1, Discussion on alignment for different numerology multiplexing, R1-166878, Aug. 2016.*

(Continued)

*Primary Examiner* — Dmitry Levitan
(74) *Attorney, Agent, or Firm* — Sughrue Mion, PLLC

(57) ABSTRACT

Embodiments of the disclosure provide a method and device for cross-numerology scheduling. The method comprises: determining at least one of a first time position associated with a first communication and a time interval between the first communication and a second communication, the first communication using a first numerology, the second communication using a second numerology and being performed in response to the first communication.

15 Claims, 18 Drawing Sheets

400 ↘

402

DETERMINING AT LEAST ONE OF A FIRST TIME POSITION ASSOCIATED WITH A FIRST COMMUNICATION AND A TIME INTERVAL BETWEEN THE FIRST COMMUNICATION AND A SECOND COMMUNICATION, THE FIRST COMMUNICATION USING A FIRST NUMEROLOGY, THE SECOND COMMUNICATION USING A SECOND NUMEROLOGY AND BEING PERFORMED IN RESPONSE TO THE FIRST COMMUNICATION

(56) References Cited

U.S. PATENT DOCUMENTS

| | | | |
|---|---|---|---|
| 10,785,759 B2* | 9/2020 | Lin | H04L 5/0051 |
| 10,880,912 B2* | 12/2020 | Moroga | H04L 5/0094 |
| 2007/0155387 A1 | 7/2007 | Li et al. | |
| 2010/0149961 A1 | 6/2010 | Lee et al. | |
| 2017/0230962 A1* | 8/2017 | Park | H04L 67/12 |
| 2019/0132172 A1* | 5/2019 | Saito | H04L 25/0224 |
| 2019/0245727 A1* | 8/2019 | Park | H04L 27/2602 |
| 2019/0261397 A1* | 8/2019 | Takeda | H04W 72/1289 |
| 2019/0349920 A1* | 11/2019 | Takeda | H04L 5/0053 |
| 2019/0386723 A1* | 12/2019 | Lin | H04L 5/0048 |
| 2020/0053677 A1* | 2/2020 | Tiirola | H04W 56/003 |
| 2020/0100273 A1* | 3/2020 | Gao | H04L 5/0055 |
| 2020/0106546 A1* | 4/2020 | Takeda | H04L 1/003 |
| 2020/0136778 A1* | 4/2020 | Takeda | H04L 27/2636 |
| 2020/0162228 A1* | 5/2020 | Gao | H04W 72/0446 |
| 2020/0244411 A1* | 7/2020 | Takeda | H04L 5/0055 |

FOREIGN PATENT DOCUMENTS

| | | |
|---|---|---|
| JP | 2018526919 A | 9/2018 |
| WO | 2016/130175 A1 | 8/2016 |
| WO | 2017032462 A1 | 3/2017 |

OTHER PUBLICATIONS

International Search Report of PCT/CN2017/088512 dated Mar. 6, 2018.

3rd Generation Partnership Project; Technical Specification Group Radio Access Network; Study on New Radio (NR) Access Technology Physical Layer Aspects (Release 14), 3GPP TR 38.802, V1.1.0, Jan. 2017, R1-1700590, 71 pages total.

Extended European Search Report dated May 25, 2020, issued by the European Patent Office in application No. 17913987.8.

Intel Corporation, "HARQ aspects for carrier aggregation", 3GPP TSG RAN WG1 Meeting #89, Hangzhou, P. R. China, May 15-19, 2017, R1-1707417, 5 pages total.

Communication dated Aug. 18, 2020, from the Japanese Patent Office in Application No. 2019-569282.

Nokia, Alcatel-Lucent Shanghai Bell, "On the transmission DL control information and data using different numerologies", 3GPP TSG-RAN WG1 #87 Reno, NV, USA, Nov. 14-18, 2016, R1-1613023, (4 pages total).

NTT DOCOMO, Inc., "Summary of [87-36]: Mini-slot designs for NR", 3GPP TSG RAN WG1 AH_NR Meeting Spokane, USA, Jan. 16-20, 2017, R1-1700617, (23 Pages Total).

Samsung, "SS block composition SS burst set composition and SS time index indication", 3GPP TSG RAN WG1 #88bis Spokane, USA Apr. 3-7, 2017, R1-1705318, (14 Pages Total).

Huawei, HiSilicon, "On NR carrier aggregation", 3GPP TSG RAN WG1 Meeting #89 Hangzhou, China, May 15-19, 2017, R1-1706903 (7 Pages Total).

3rd Generation Partnership Project;, "Technical Specification Group Radio Access Network; Study on New Radio (NR) access technology (Release 14)", 3GPP TR 38.912 V14.0.0, Mar. 2017, (74 Pages Total).

LG Electronics, "Discussion on scheduling and HARQ for NR CA", 3GPP TSG RAN WG1 Meeting #89, Hangzhou, P.R. China May 15-19, 2017, R1-1707666 (5 pages total).

Office Action dated Jan. 5, 2021 in Japanese Application No. 2019-569282.

* cited by examiner

REPLACEMENT SHEET

US 11,051,328 B2

METHOD AND DEVICE FOR CROSS-NUMEROLOGY SCHEDULING

CROSS REFERENCE TO RELATED APPLICATIONS

This application is a Continuation of U.S. application Ser. No. 16/619,322 filed Dec. 4, 2019, which is a National Stage of International Application No. PCT/CN2017/088512 filed Jun. 15, 2017.

FIELD OF THE INVENTION

Embodiments of the present disclosure generally relate to communication techniques. More particularly, embodiments of the present disclosure relate to a method and device for cross-numerology scheduling.

BACKGROUND OF THE INVENTION

In recent years, a New Radio (NR) access system has been developed. The NR considers frequency ranges up to 100 GHz with the objective of a single technical framework addressing all usage scenarios, requirements and deployment scenarios defined in TR 38.913 which include enhanced mobile broadband, massive machine-type-communications and ultra reliable and low latency communications. Multiple numerologies are supported in NR for different scenarios. The parameters for numerology may include at least one of value of subcarrier spacing (SCS) and length of cyclic prefix (CP), and corresponding frame/slot structure may be based on the numerology. Therefore, there is a need to develop cross-numerology scheduling timing under different numerologies.

SUMMARY OF THE INVENTION

The present disclosure proposes a solution for reducing interference on boundaries of resource blocks employing different numerologies.

According to a first aspect of embodiments of the present disclosure, embodiments of the present disclosure provide a method performed by a communication device. The method comprises: determining at least one of a first time position associated with a first communication and a time interval between the first communication and a second communication, the first communication using a first numerology, the second communication using a second numerology and being performed in response to the first communication.

According to a second aspect of embodiments of the present disclosure, embodiments of the disclosure provide a communication device. The communication device comprises: at least one controller; a memory coupled to the at least one controller, the memory storing instructions therein, the instructions, when executed by the at least one controller, causing the communication device to perform acts including: determine at least one of a first time position associated with a first communication and a time interval between the first communication and a second communication, the first communication using a first numerology, the second communication using a second numerology and being performed in response to the first communication.

According to a third aspect of embodiments of the present disclosure, embodiments of the disclosure provide a computer readable medium. The computer readable medium storing instructions thereon, the instructions, when executed by at least one processing unit of a machine, causing the machine to perform the method according to the first aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

DETAILED DESCRIPTION OF EMBODIMENTS

Figure 1A:
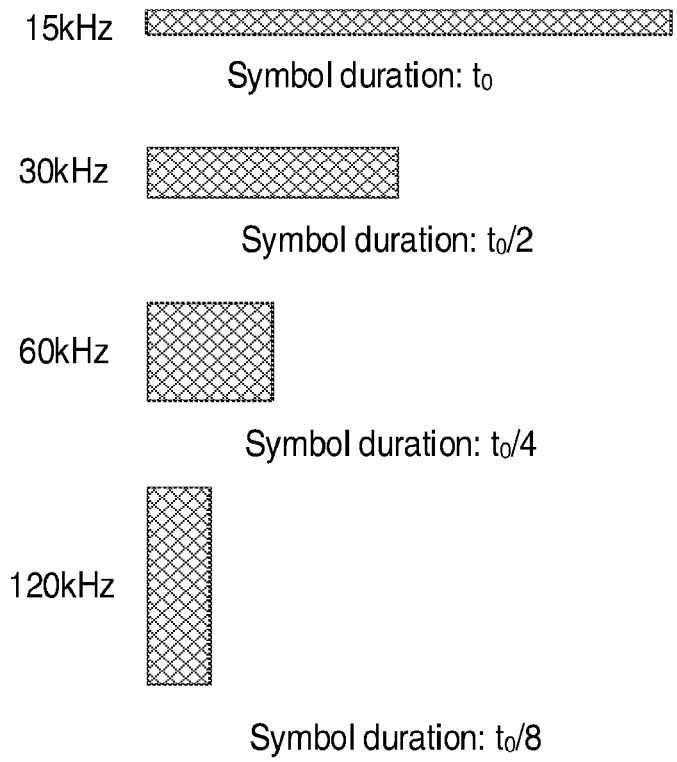
FIG. 1A shows some examples for symbol duration for different SCS according to conventional solutions.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the Figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), New Radio (NR) Access and so on.

Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "communication device" includes, but not limited to, "network device" and "terminal device." The term "network device" includes, but not limited to, a base station (BS), a gateway, a management entity, and other suitable device in a communication system. The term "base station" or "BS" represents a node B (NodeB or NB), an evolved NodeB (eNodeB or eNB), a next generation NodeB (gNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

In the context of the present disclosure, the term "numerology" refers to a set of parameters. The parameters include, for example, but not limited to, a subcarrier spacing (SCS), a symbol length, a length of a cyclic prefix (CP), and so on. For instance, numerology for a subcarrier spacing of 15 KHz may include 14 symbols in one millisecond, a normal CP, and so on. A numerology for a subcarrier spacing of 30 KHz may include 28 symbols in one millisecond, a normal CP, and so on. Such a numerology is different from the numerology for the subcarrier spacing of 15 KHz.

As described above, multiple numerologies are supported in NR system. In 38.912, numerologies and frame structure for NR are determined. A numerology is defined by subcarrier spacing and CP overhead. Multiple subcarrier spacings can be derived by scaling a basic carrier spacing by an integer M. A subframe duration is fixed to 1 ms and the frame length is 10 ms. Scalable numerology should allow at least from 15 kHz to 480 kHz subcarrier spacing. There are some different subcarrier spacing values for different frequency bands. For example, the values of subcarrier spacing can be 15 kHz and 30 kHz when the frequency band is below 1 GHz. When the frequency band is between 1 GHz and 6 GHz, the values of subcarrier spacing can be 15 kHz, 30 kHz and 60 kHz. When the frequency band is between 24 GHz and 52.6 GHz, the values of subcarrier spacing can be 60 kHz and 320 kHz. That is to say, the values of subcarrier frequency depend on the frequency bands. When the value of subcarrier spacing is not larger than 60 kHz, there are usually 7 or 14 OFDM symbols in one time slot. When the value of subcarrier spacing is above 60 kHz, there are usually 14 OFDM symbols in one time slot.

Figure 1B:
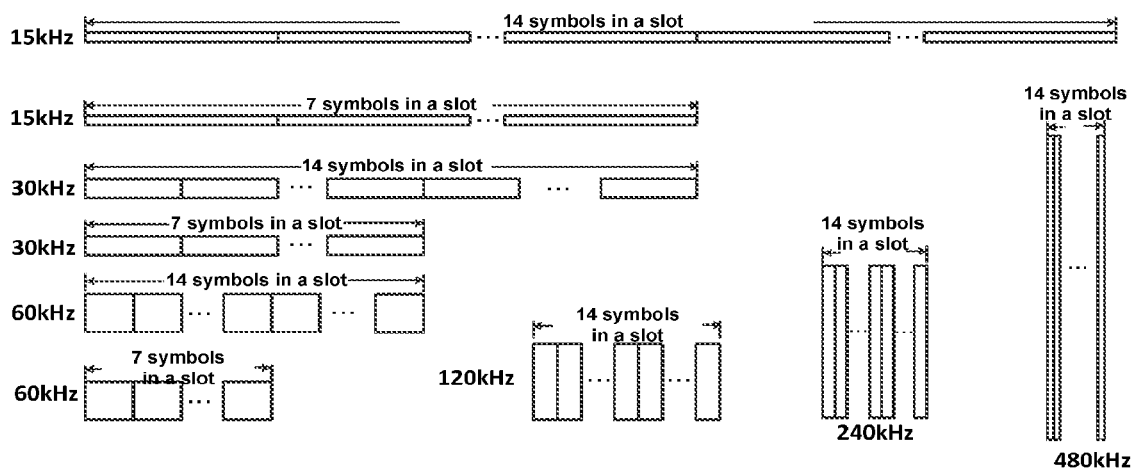
FIG. 1B shows some examples for slot duration for different SCS according to conventional solutions.

FIG. 1A shows some examples for symbol duration for different values of SCS according to conventional solutions. FIG. 1B shows some examples for slot duration for different values of SCS according to conventional solutions. As shown in FIG. 1B, when the value of subcarrier spacing equals to 15 kHz, in one example, there may be 14 symbols in one slot, and the slot duration may be 1 ms. In another example, there may be 7 symbols in one slot, and the slot duration may be 0.5 ms. When the value of subcarrier spacing equals to 30 kHz, in one example, there may be 14 symbols in one slot, and the slot duration may be 0.5 ms. In another example, there may be 7 symbols in one slot, and the slot duration may be 0.25 ms. When the value of subcarrier spacing equals to 60 kHz, in one example, there may be 14 symbols in one slot, and the slot duration may be 0.25 ms. In another example, there may be 7 symbols in one slot, and the slot duration may be 0.125 ms. When the value of subcarrier spacing equals to 120 kHz, in example, there may be 14 symbols in one slot, and the slot duration may be 0.125 ms. When the value of subcarrier spacing equals to 240 kHz, in one example, there may be 14 symbols in one slot, and the slot duration may be 0.0625 ms. When the value of subcarrier spacing equals to 480 kHz, in one example, there may be 14 symbols in one slot, and the slot duration may be 0.03125 ms.

In NR system, agreements have been made regarding scheduling and/or feedback delays. For instance, for slot-based scheduling, NR specification should support the followings: downlink (DL) data reception in slot N and corresponding acknowledgment in slot N+k1; uplink (UL) assignment in slot N and corresponding UL data transmission in slot N+k2. When the values of subcarrier spacing are different, there may be different lengths/duration of time interval of OFDM symbol and/or slot. In recent agreements, timing relationships in NR (for example, hybrid automatic repeat request and timing between DL assignment transmission and corresponding DL data transmission) are still indicated in terms of slots. In such situations, if cross-numerology scheduling is supported, the duration of a slot in two numerologies may be different. For example, physical downlink control channel (PDCCH) is transmitted with 15 kHz and physical downlink shared channel (PDSCH) is scheduled with 30 kHz. The scheduling interval between PDCCH and PDSCH is N+K. N represents an index of a time slot and K represents the number of time slot. In this situation, it is agnostic whether N is based on slot duration of 15 kHz or slot duration of 30 kHz. In other words, the ending position of PDCCH or the starting position of counting K for PDSCH is agnostic. It is also agnostic whether K is based on slot duration of 15 kHz and slot duration of 30 kHz. In other words, the starting position of PDSCH is agnostic.

Figure 2A:
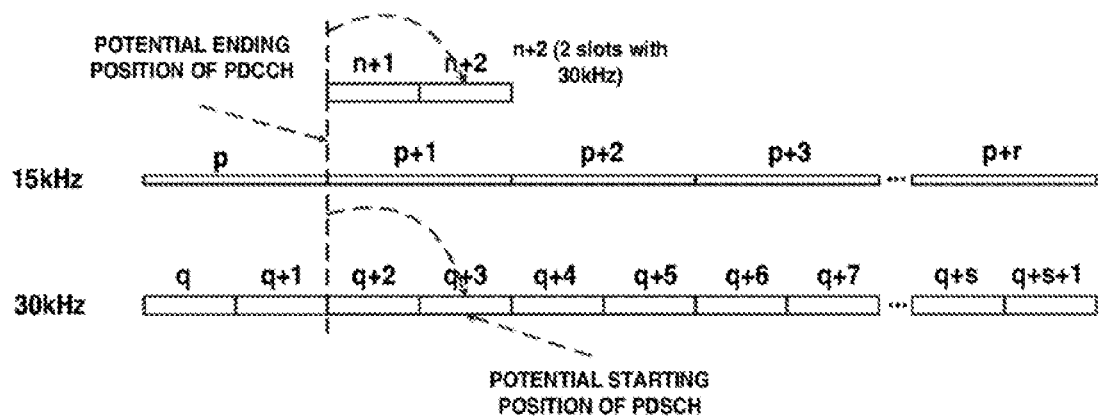
FIGS. 2A-2D illustrate different ending positions of PDCCH combined with different starting positions of PDSCH when the duration of time slot for N and the duration of time slot of K are not explicit.
Figure 2B:
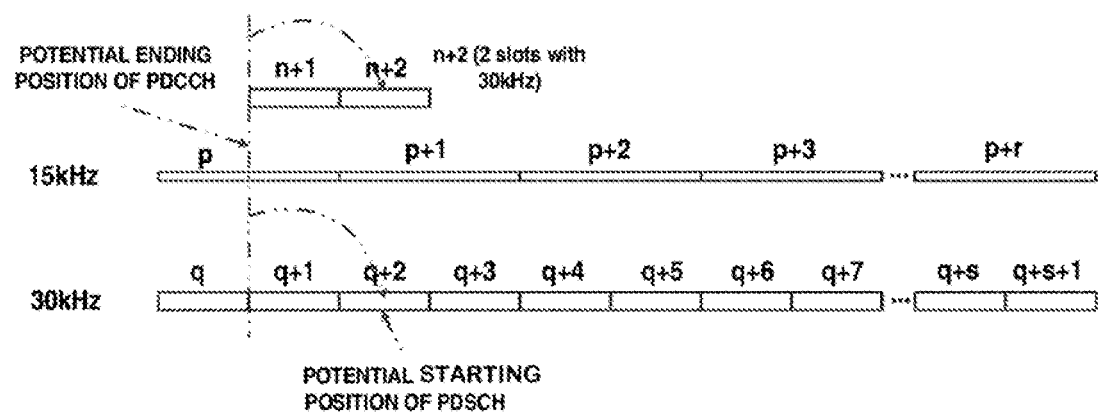
Figure 2C:
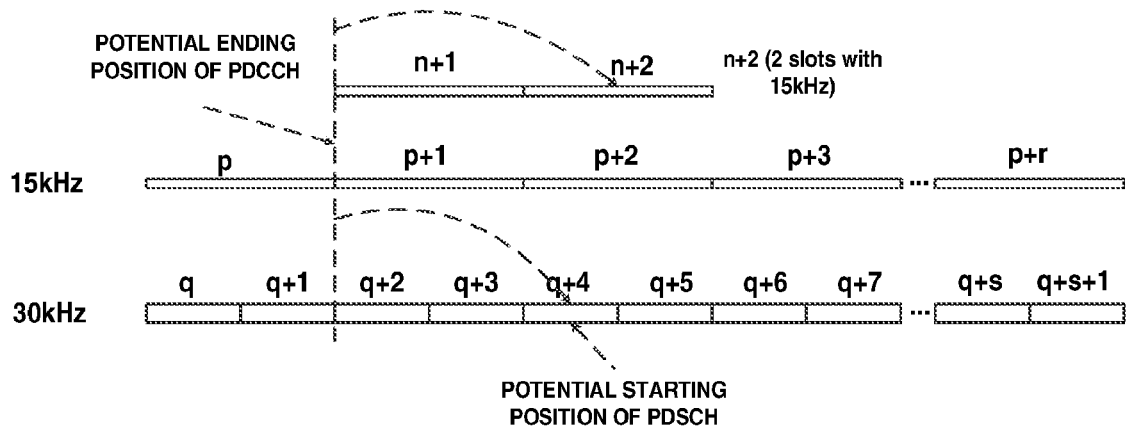
Figure 2D:
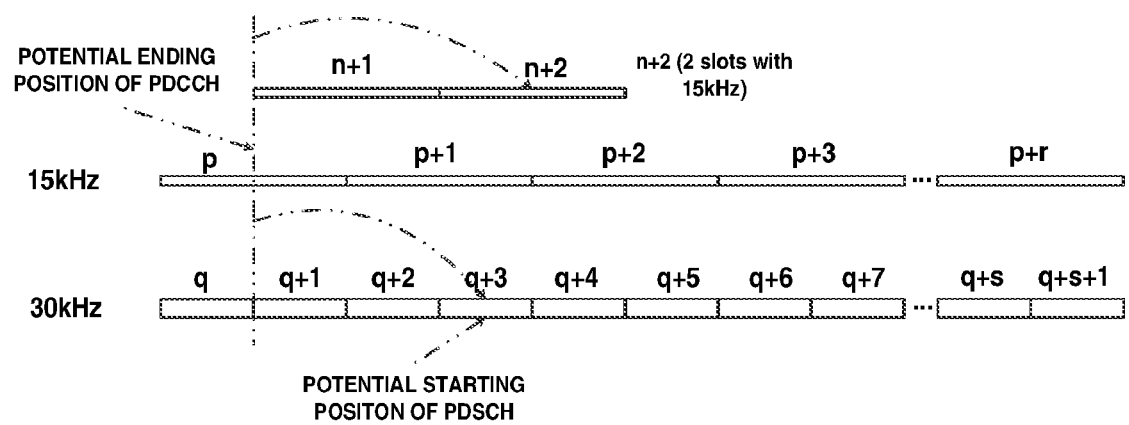

FIGS. 2A-2D illustrate different ending positions of PDCCH combined with different starting positions of PDSCH when the duration of time slot for N and the duration of time slot of K are not explicit. In the examples shown in FIGS. 2A-2D, the value of K is 2, and p and q represent a time slot of 15 kHz and a time slot of 30 kHz, respectively. FIG. 2A shows the potential ending position of PDCCH and the potential starting position of PDSCH when N is based on the slot duration of 15 kHz and K is based on the slot duration of 30 kHz. FIG. 2B shows the potential ending position of PDCCH and the potential starting position of PDSCH when both N and K are based on the slot duration of 30 kHz. FIG. 2C shows the potential ending position of PDCCH and the potential starting position of PDSCH when both N and K are based on the slot duration of 15 kHz. FIG. 2D shows the potential ending position of PDCCH and the potential starting position of PDSCH when N is based on the slot duration of 30 kHz and K is based on the slot duration of 15 kHz. Although not shown, the above situations also exist among PDCCH scheduling PUSCH, ACK/NACK feedback for PDSCH and RAR reception of PRACH transmission.

In order to solve the above and other potential problems, embodiments of the present disclosure provide solutions for cross-numerology scheduling.

Figure 3:
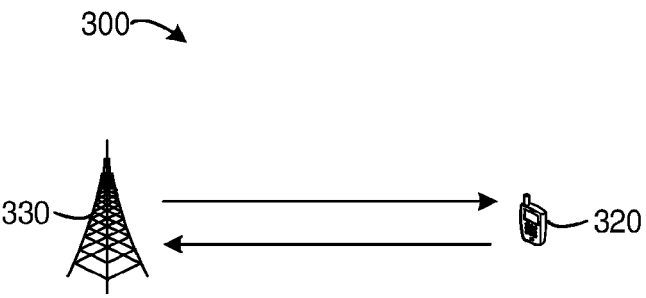
FIG. 3 illustrates a communication system 300 where embodiments presented herein can be applied.

Now some exemplary embodiments of the present disclosure will be described below with reference to the Figures. Reference is first made to FIG. 3, which illustrates a communication system 300 where embodiments presented herein can be applied. In the communication system 300, there illustrate a network device (for example, an eNB) 330 that communicates with a terminal device (for example, a UE) 320.

Figure 4:
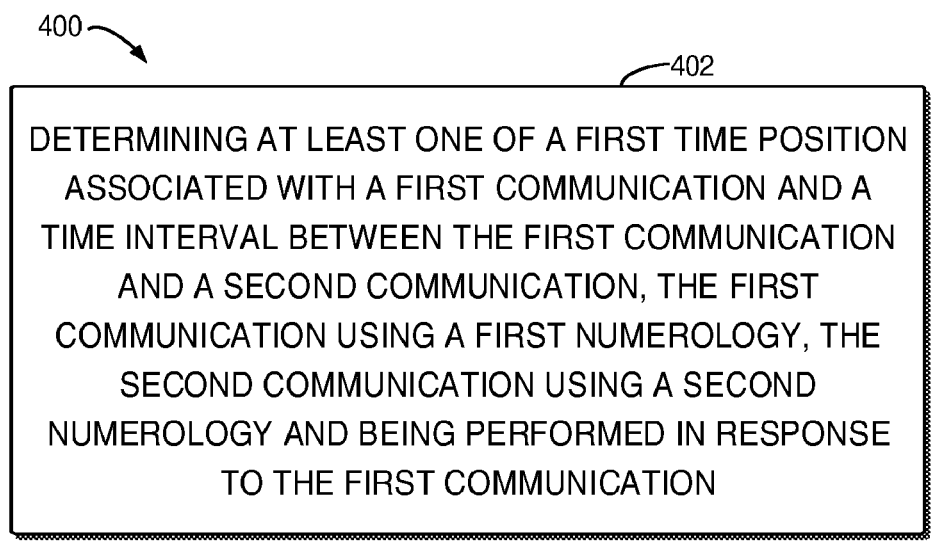
FIG. 4 illustrates a flow chart of a method 400 according to embodiments of the present disclosure.

Now some exemplary embodiments of the present disclosure will be described below with reference to the following Figures. FIG. 4 illustrates a flow chart of a method 400 according to embodiments of the present disclosure. The method 400 may be implemented by the communication device including the network device 330 (for example, an eNB) and the terminal device 320 (for example, UE).

At 402, the communication device determines at least one of a first time position associated with a first communication and a time interval between the first communication and a second communication. The first communication uses a first numerology and the second communication uses a second numerology and is performed in response to the first communication.

In some embodiments, the method 400 further includes: determining a duration of a first reference time slot based on a first reference numerology; and determining the first time position based on the duration of the first reference time slot and an index of the first reference time slot. For example, the duration of the first reference time slot may be determined based on the value of subcarrier spacing and/or CP length of the first reference numerology.

In some embodiments, the first communication may be at least one of: downlink control information for downlink data assignment, downlink control information for uplink data assignment, downlink transmission/reception of data, and random access transmission. In some embodiments, the second communication may be at least one of: downlink transmission/reception of data, uplink transmission/reception of data, acknowledgement for the downlink transmission/reception of data, and response for the random access channel transmission.

In some embodiments, the first time position may be the end of the time duration for the first communication and/or the starting of the counting for number of symbols/slots/mini-slots for the second communication. The time duration for the first communication may be time duration of slot(s)/symbol(s)/mini-slot(s) based on the value of subcarrier spacing and/or CP length which are configured for the first communication. In one embodiment, the first time position may be the end of the slot for the first communication. The slot duration may be based on the value of subcarrier spacing and/or CP length which are configured for the first communication.

Figure 5A:
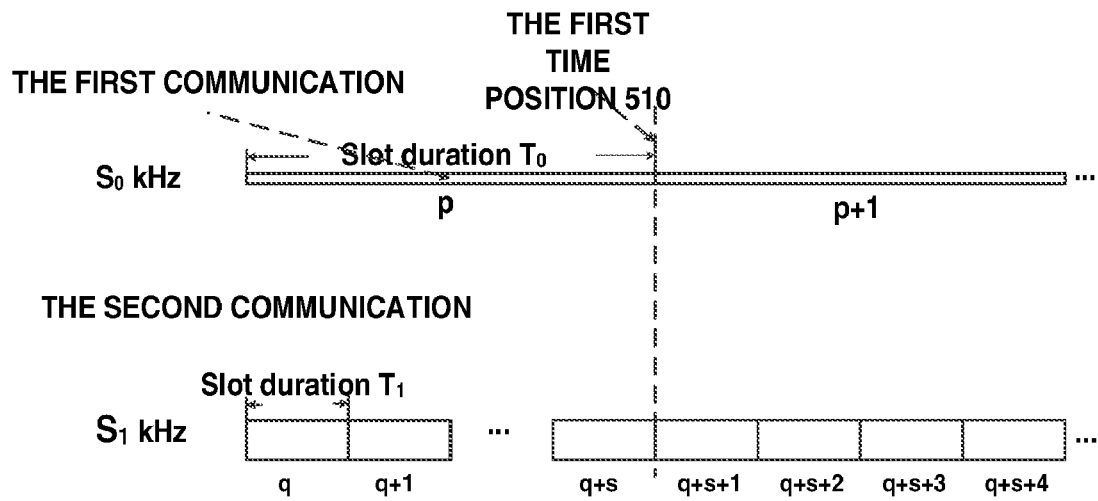
FIGS. 5A-5C illustrate determining a first position 510 associated with a first communication according to an example embodiment of the disclosure, where the first reference numerology is the same as the first numerology used by the first communication.
Figure 5B:
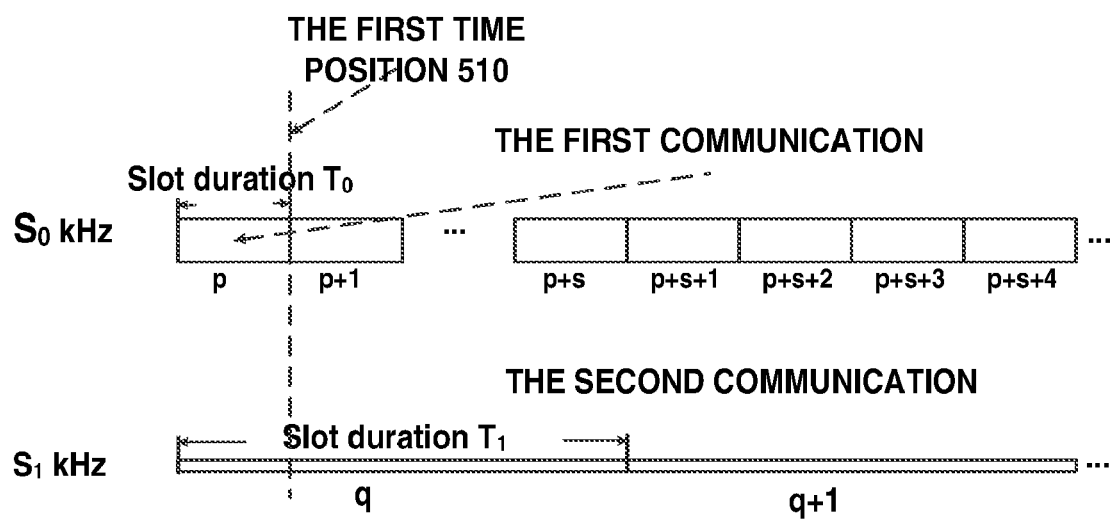
Figure 5C:
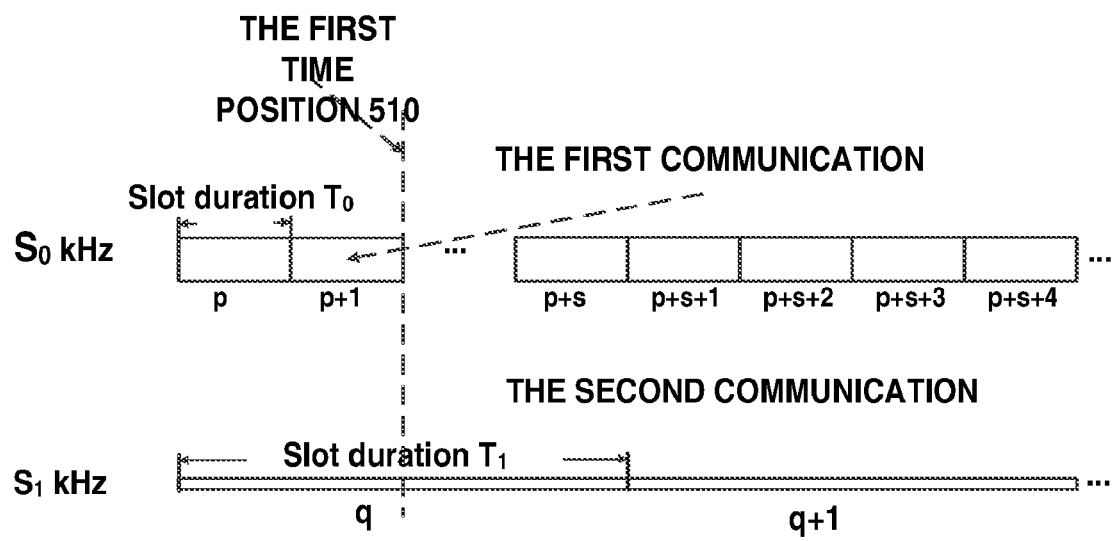

FIGS. 5A-5C illustrate determining a first position 510 associated with a first communication according to an example embodiment of the disclosure, where the first reference numerology is the same as the first numerology used by the first communication. That is to say, the value of subcarrier spacing and/or CP length of the first reference numerology are the same as the value of subcarrier spacing and/or CP length of the first numerology used by the first communication. In some embodiments, the first communication and the second communication may be one of: downlink control information for downlink data assignment and downlink transmission of data, downlink control information for uplink data assignment and uplink transmission of data, downlink transmission of data and acknowledgement for the downlink transmission of data, and random access transmission and response for the random access channel transmission.

By way of example, as shown in FIGS. 5A-5C, the first communication uses a first numerology, for example, the SCS for the first communication is $S_0$ kHz. The second communication uses a second numerology, for example, the SCS for the second communication is $S_1$ kHz. As described above, in FIGS. 5A-5C, the value of subcarrier spacing and/or CP length of the first numerology used by the first communication are used as the value of subcarrier spacing and/or CP length of the first reference numerology. Therefore, in FIGS. 5A-5C, the duration of the first reference time slot is $T_0$, which is determined based on the value of subcarrier spacing and/or CP length. The first time position 510 is determined based on the duration $T_0$ of the first reference time slot (in this embodiment, p, p+1, . . . , p+r) and an index N of the first reference time slot. In some embodiments, when the method 400 is implemented by the terminal device 320, the index of the first reference time slot is obtained from a message transmitted from the network device 330. In some embodiments, when the method 400 is implemented by the terminal device 320, the index of the first reference time slot is obtained from a message transmitted from the network device 330. In some embodiments, when the method 400 is implemented by the terminal device 320, the first numerology of the first communication, the second numerology of the second communication and the first reference numerology of the first reference time slot are configured by the network device 330. In some embodiments, the value of subcarrier spacing and/or CP length of the first reference time slot may be the same as the value of subcarrier spacing and/or CP length configured for the first communication. That is, there may be no definition of the first reference value of subcarrier spacing and/or CP length for the first reference time slot.

In FIG. 5A, the SCS for the first communication is smaller than the SCS for the second communication. As shown in FIG. 5A, the first time position 510 may be at the end of the time slot p of the first communication and/or may be at the end of the time slot q+s of the second communication.

In FIG. 5B, the SCS for the first communication is larger than the SCS for the second communication and the first communication is finished within the duration of time slot p of the first communication. As shown in FIG. 5B, the first time position 510 may be at the end of the time slot p of the first communication and/or is within the time slot q of the second communication.

In FIG. 5C, the SCS for the first communication is larger than the SCS for the second communication and the first communication is finished within the duration of time slot p+1 of the first communication. As shown in FIG. 5C, the first time position 510 may be at the end of the time slot p+1 of the first communication and/or is within the time slot q of the second communication.

In some embodiments, the first time position may be the position of the starting or ending of a time slot which is after the end of the first communication and/or the starting of the counting for number of symbols/slots/mini-slots for the second communication. The time duration may be time duration of slot(s)/symbol(s)/mini-slot(s) based on the value of subcarrier spacing and/or CP length configured for the second communication. In some embodiments, the first time position may be the starting of the earliest time slot which is after the first communication, and the time duration may be based on the value of subcarrier spacing and/or CP length configured for the second communication.

FIGS. 6A-6D illustrate determining a first position 610 associated with a first communication according to an example embodiment of the disclosure, where the first reference numerology is the same as the second numerology used by the second communication. That is, the value of subcarrier spacing and/or CP length of the first reference numerology are the same as the value of subcarrier spacing and/or CP length of the second numerology used by the second communication.

By way of example, as shown in FIGS. 6A-6D, the first communication uses a first numerology, for example, the SCS for the first communication is $S_0$ kHz. The second communication uses a second numerology, for example, the SCS for the second communication is $S_1$ kHz. As described above, in FIGS. 6A-6D, the value of subcarrier spacing and/or CP length of second numerology of the second communication are used as the value of subcarrier spacing and/or CP length of the first reference numerology. Therefore, in FIGS. 6A-6D, the duration of the first reference time slot is $T_1$, which is determined based on the second numerology. For example, the duration of the first reference time slot may be determined based on the value of subcarrier spacing and/or CP length of the second numerology. The first time position 610 is determined based on the duration $T_1$ of the first reference time slot (in this embodiment, q, q+1, . . . , q+s) and an index N of the first reference time slot. In some embodiments, when the method 400 is implemented by the terminal device 320, the index of the first reference time slot is obtained from a message transmitted from the network device 330. In some embodiments, when the method 400 is implemented by the terminal device 320, the first numerology of the first communication, the second numerology of the second communication and the first reference of the first reference time slot are configured by the network device 330. In some embodiments, the first reference value of subcarrier spacing and/or CP length of the first reference time slot may be the same as the value of subcarrier spacing and/or CP length configured for the second communication. That is, there may be no definition of the first reference value of subcarrier spacing and/or CP length for the first reference time slot.

Figure 6A:
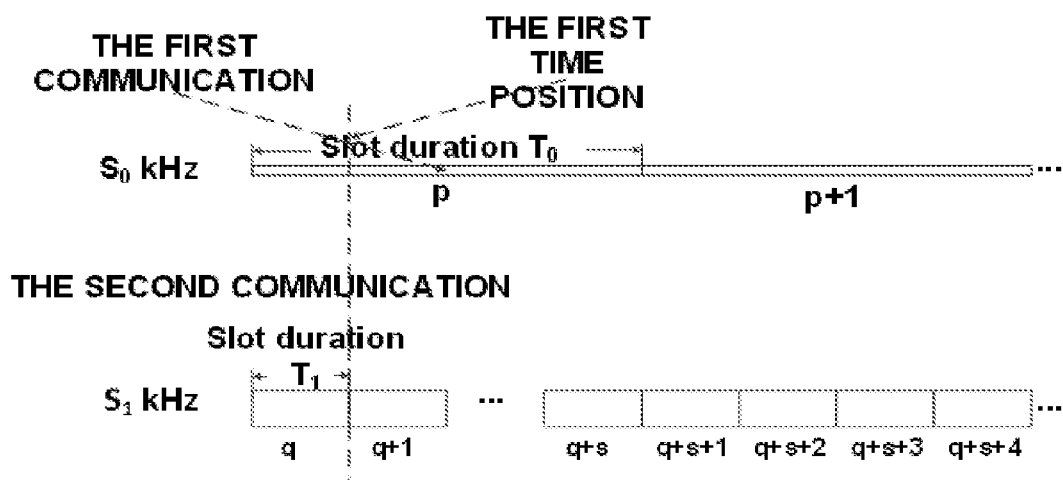
FIGS. 6A-6D illustrate determining a first position 610 associated with a first communication according to an example embodiment of the disclosure, where the first reference numerology is the same as the second numerology used by the second communication.

In FIG. 6A, the SCS for the first communication is smaller than the SCS for the second communication. As shown in FIG. 6A, the first time position 610 is within the time slot p of the first communication and/or may be at the end of the time slot q of the second communication. The first time position is after the end of the first communication.

Figure 6B:
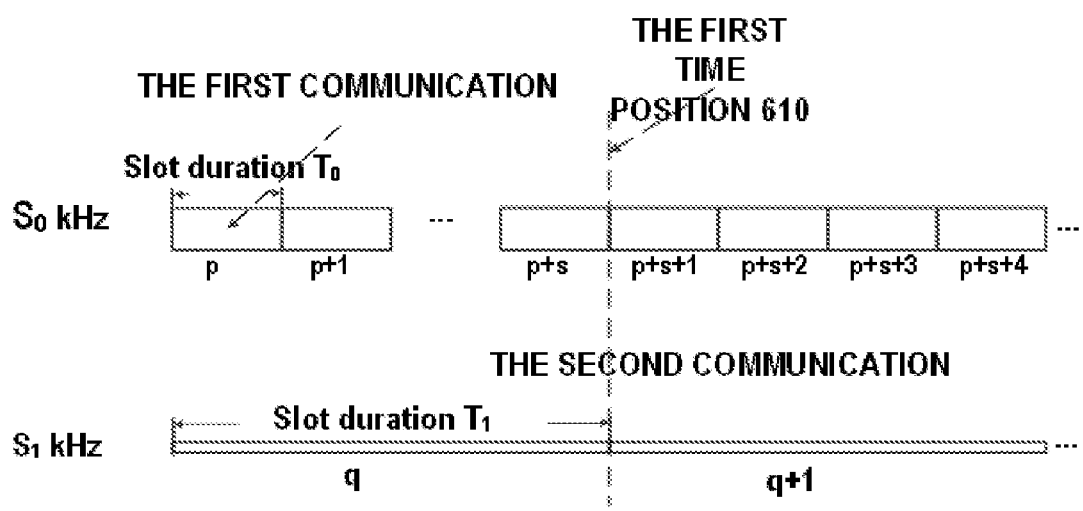

In FIG. 6B, the SCS for the first communication is larger than the SCS for the second communication and the first communication is finished within the duration of time slot p of the first communication. As shown in FIG. 6B, the first time position 610 may be at the end of the time slot p+s of the first communication and/or may be at the end of the time slot q of the second communication. The first time position is after the end of the first communication.

Figure 6C:
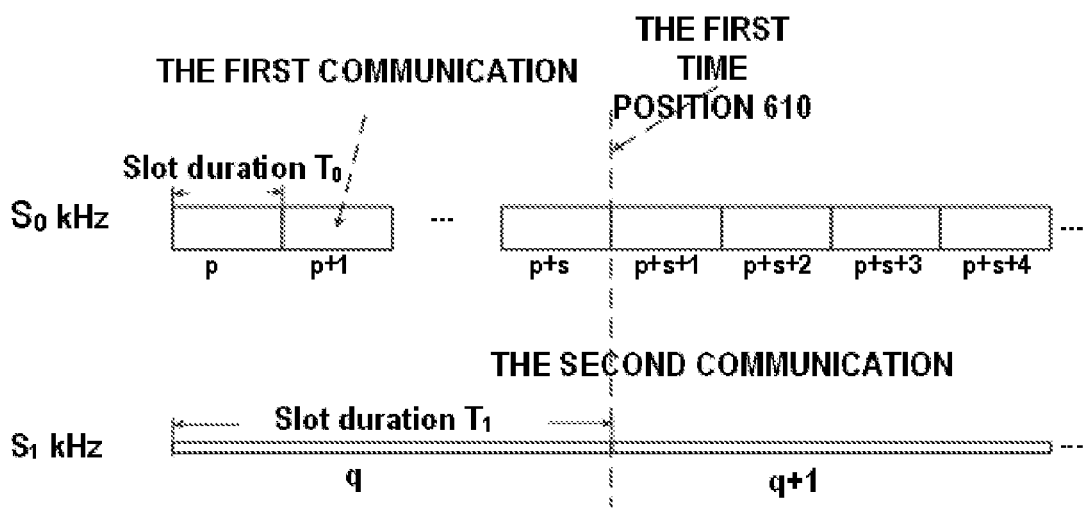

In FIG. 6C, the SCS for the first communication is larger than the SCS for the second communication and the first communication is finished within the duration of time slot p+1 of the first communication. As shown in FIG. 6C, the first time position 610 may be at the end of the time slot p+s of the first communication and/or may be at the end of the time slot q of the second communication. The first time position is after the end of the first communication.

Figure 6D:
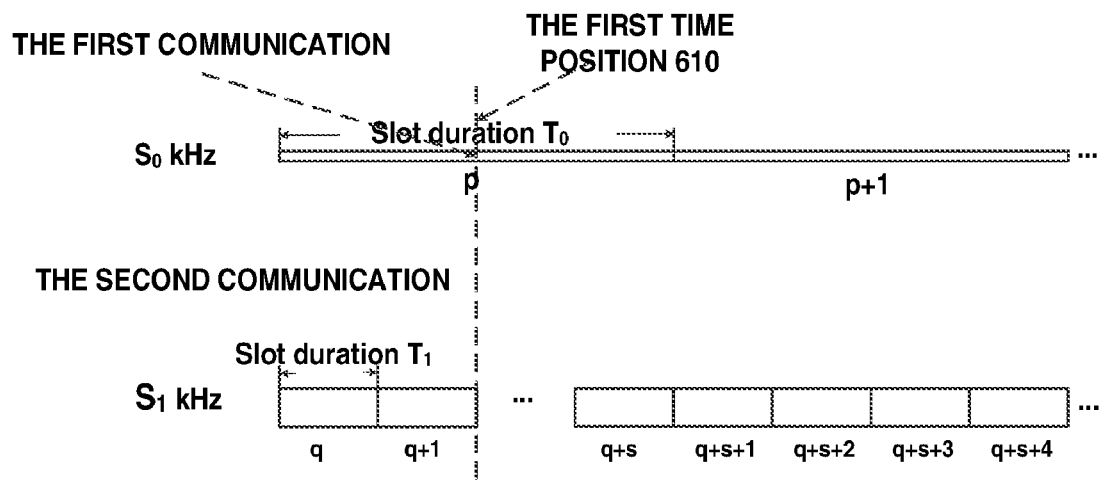

In FIG. 6D, the SCS for the first communication is smaller than the SCS for the second communication and the first communication is finished within the duration of time slot q+1 of the second communication. As shown in FIG. 6D, the first time position 610 may be at the starting of the first time slot q+2 of the second communication after the first communication is finished. The first time position 610 may also be at the end of the time slot q+1 where the first communication is finished. The first time position is after the end of the first communication.

In some embodiments, the first time position may be the position of the starting or ending of a time slot which is after the end of the first communication and/or the starting of the counting for number of symbols/slots/mini-slots for the second communication. The time duration may be time duration of slot(s)/symbol(s)/mini-slot(s) based on the minimum value of subcarrier spacing and/or CP length between the first value of subcarrier spacing and/or CP length used by the first communication and the second value of subcarrier spacing and/or CP length used by the second communication. In some embodiments, the first time position may be the starting of the earliest time slot which is after the first communication, and the time duration may be based on the minimum value of subcarrier spacing and/or CP length between the first value of subcarrier spacing and/or CP length used by the first communication and the second value of subcarrier spacing and/or CP length used by the second communication.

Figure 7A:
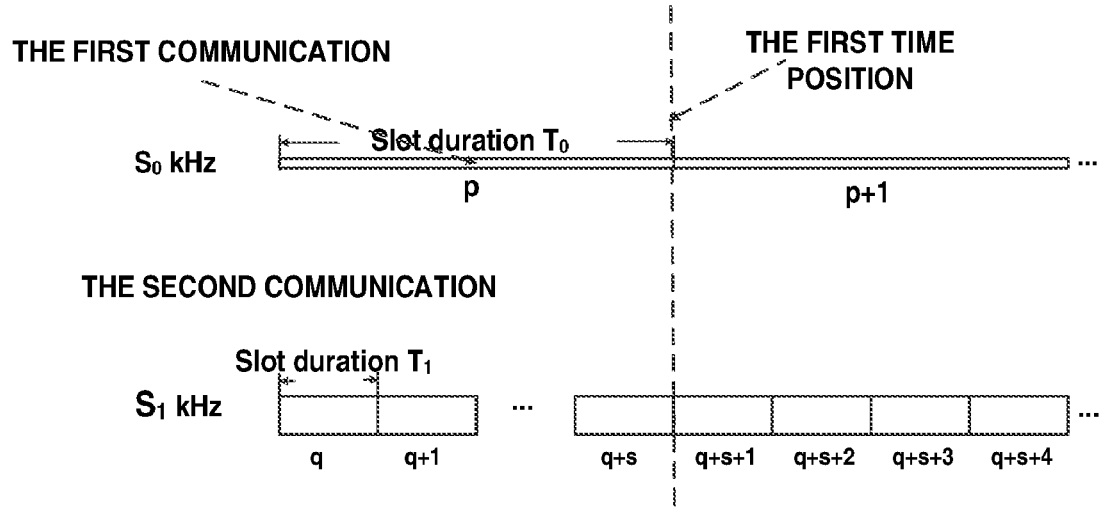
FIGS. 7A-7C illustrate determining a first position 710 associated with a first communication according to an example embodiment of the disclosure, where the first reference numerology is the minimum numerology between the first numerology used by the first communication and the second numerology used by the second communication.
Figure 7B:
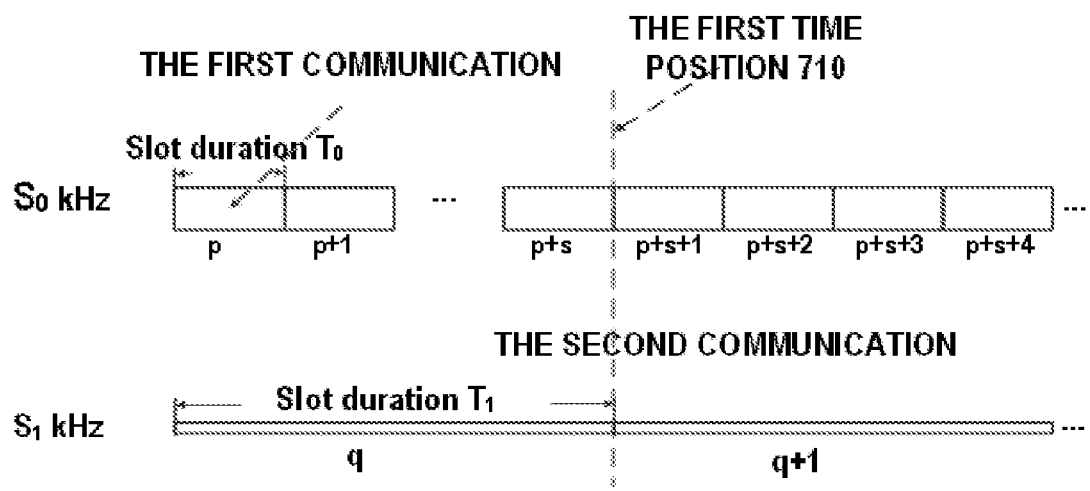
Figure 7C:
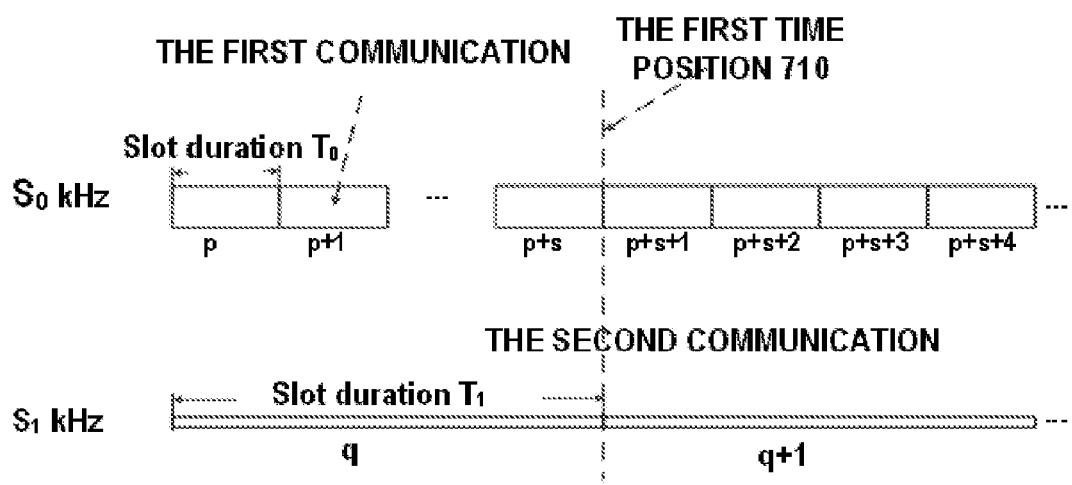

FIGS. 7A-7C illustrate determining a first position 710 associated with a first communication according to an example embodiment of the disclosure, where the first reference numerology is the minimum numerology between the first numerology used by the first communication and the second used by the second communication. That is, the value of subcarrier spacing and/or CP length of the first reference numerology are the same as the minimum value of subcarrier spacing and/or minimum CP length of the first numerology and the second numerology.

By way of example, as shown in FIGS. 7A-7C, the first communication uses a first numerology, for example, the SCS for the first communication is $S_0$ kHz. The second communication uses a second numerology, for example, the SCS for the second communication is $S_1$ kHz. As described above, in FIGS. 7A-7C, the minimum value of subcarrier spacing and/or CP length between the first value of subcarrier spacing and/or CP length and the second value of subcarrier spacing and/or CP length is used as the first reference value of subcarrier spacing and/or CP length. In some embodiments, when the method 400 is implemented by the terminal device 320, the index of the first reference time slot is obtained from a message transmitted from the network device 330. In some embodiments, when the method 400 is implemented by the terminal device 320, the first numerology of the first communication, the second numerology of the second communication and/or the first reference numerology of the first reference time slot are configured by the network device 330. In some embodiments, the first reference value of subcarrier spacing and/or CP length of the first reference time slot may be the same as the minimum value of subcarrier spacing and/or CP length between the first value of subcarrier spacing and/or CP length used by the first communication and the second value of subcarrier spacing and/or CP length used by the second communication. That is, there may be no definition of the first reference value of subcarrier spacing and/or CP length for the first reference time slot.

In FIG. 7A, the SCS for the first communication is smaller than the SCS for the second communication. Therefore, the first value of subcarrier spacing and/or CP length of the first communication is used as the value of subcarrier spacing and/or CP length of the first reference numerology and the duration of the first reference time slot is $T_0$, which is determined based on the value of subcarrier spacing and/or CP length of the first numerology. The first time position 710 is determined based on the duration $T_0$ of the first reference time slot (in this embodiment, p, p+1, . . . , p+r) and the index N of the first reference time slot. As shown in FIG. 7A, the first time position 710 may be at the end of the time slot p of the first communication and/or may be at the end of the time slot q+s of the second communication.

In FIG. 7B, the SCS for the first communication is larger than the SCS for the second communication and the first communication is finished within the duration of time slot p of the first communication. Therefore, the value of subcarrier spacing and/or CP length of the second numerology used by the second communication is used as the value of subcarrier spacing and/or CP length of the first reference numerology and the duration of the first reference time slot is $T_1$, which is determined based on the value of subcarrier spacing and/or CP length the second numerology used by the second communication. As shown in FIG. 7B, the first time position 710 may be at the end of the time slot p+s of the first communication and/or may be at the end of the time slot q of the second communication. The first time position is after the end of the first communication.

In FIG. 7C, the SCS for the first communication is larger than the SCS for the second communication and the first communication is finished within the duration of time slot p+1 of the first communication. As shown in FIG. 7C, the first time position 710 may be at the end of the time slot p+s of the first communication and/or may be at the end of the time slot q of the second communication. The first time position is after the end of the first communication.

In some embodiments, the first time position may be the position of the starting or ending of a time slot which is after the end of the first communication and/or the starting of the counting for number of symbols/slots/mini-slots for the second communication. The time duration may be time duration of slot(s)/symbol(s)/mini-slot(s) based on the maximum value of subcarrier spacing and/or CP length between the first value of subcarrier spacing and/or CP length used by the first communication and the second value of subcarrier spacing and/or CP length used by the second communication. In some embodiments, the first time position may be the starting of the earliest time slot which is after the first communication, and the time duration may be based on the maximum value of subcarrier spacing and/or CP length between the first value of subcarrier spacing and/or CP length used by the first communication and the second value of subcarrier spacing and/or CP length used by the second communication.

Figure 8A:
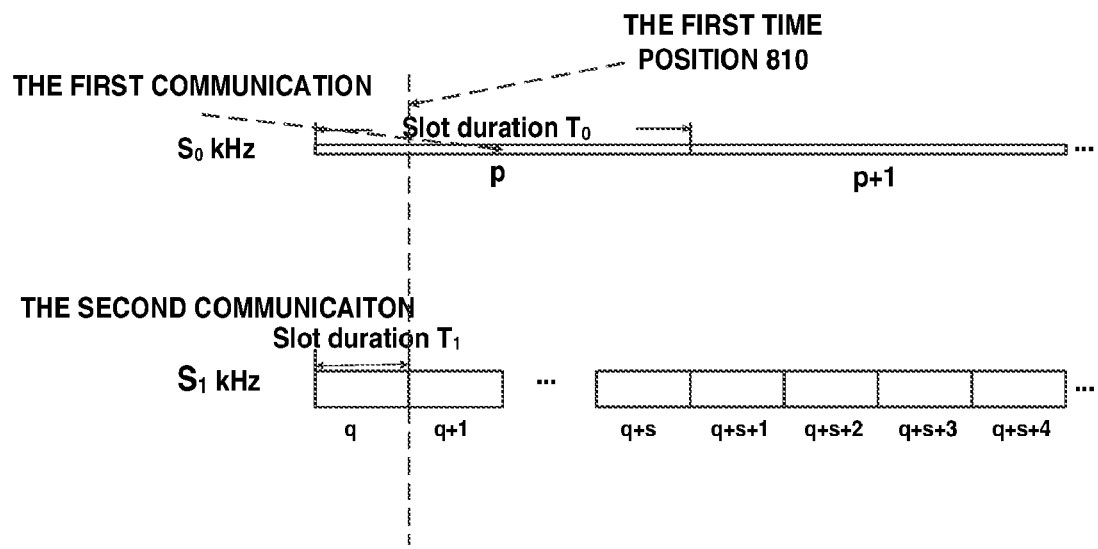
FIGS. 8A-8C illustrate determining a first position 810 associated with a first communication according to an example embodiment of the disclosure, where the first reference numerology is the maximum numerology between the first numerology used by the first communication and the second numerology used by the second communication.
Figure 8B:
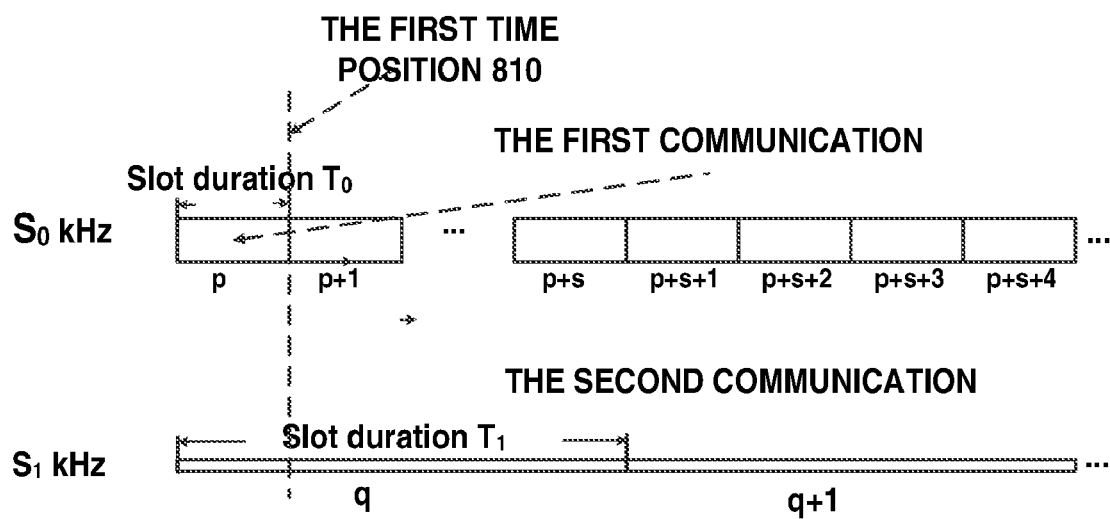
Figure 8C:
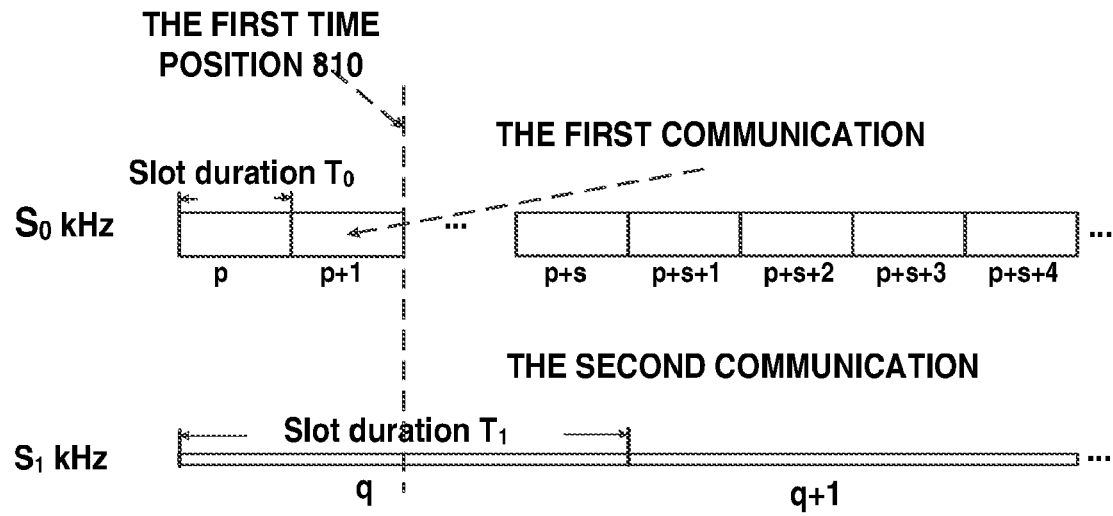

FIGS. 8A-8C illustrate determining a first position 810 associated with a first communication according to an example embodiment of the disclosure, where the first reference numerology is the maximum numerology between the first numerology used by the first communication and the second numerology used by the second communication. That is, the value of subcarrier spacing and/or CP length of the first reference numerology are the maximum value between the value of subcarrier spacing and/or CP length of the first numerology used by the first communication and the value of subcarrier spacing and/or CP length of the second numerology used by the second communication.

By way of example, as shown in FIGS. 8A-8C, the first communication uses a first numerology, for example, the SCS for the first communication is $S_0$ kHz. The second communication uses a second numerology, for example, the SCS for the second communication is $S_1$ kHz. As described above, in FIGS. 8A-8C, the maximum value of subcarrier spacing and/or CP length between the first value of subcarrier spacing and/or CP length and the second value of subcarrier spacing and/or CP length is used as the first reference value of subcarrier spacing and/or CP length. In some embodiments, when the method 400 is implemented by the terminal device 320, the index of the first reference time slot is obtained from a message transmitted from the network device 330. In some embodiments, when the method 400 is implemented by the terminal device 320, the first numerology of the first communication, the second numerology of the second communication and/or the first reference numerology of the first reference time slot are configured by the network device 330. In some embodiments, the first reference value of subcarrier spacing and/or CP length of the first reference time slot may be the same as the maximum value of subcarrier spacing and/or CP length between the first value of subcarrier spacing and/or CP length used by the first communication and the second value of subcarrier spacing and/or CP length used by the second communication. That is, there may be no definition of the first reference value of subcarrier spacing and/or CP length for the first reference time slot.

In FIG. 8A, the SCS for the first communication is smaller than the SCS for the second communication. Therefore, the second value of subcarrier spacing and/or CP length of the second communication are used as the first reference value of subcarrier spacing and/or CP length and the duration of the first reference time slot is $T_1$, which is determined based on the second value of subcarrier spacing and/or CP length. The first time position 810 is determined based on the duration $T_1$ of the first reference time slot (in this embodiment, q, q+1, . . . , q+r) and the index N of the first reference time slot. As shown in FIG. 8A, the first time position 810 may be within the time slot p of the first communication and/or may be at the end of the time slot q of the second communication. The first time position is after the end of the first communication.

In FIG. 8B, the SCS for the first communication is larger than the SCS for the second communication and the first communication is finished within the duration of time slot p of the first communication. Therefore, the first value of subcarrier spacing and/or CP length of the first communication are used as the first reference value of subcarrier spacing and/or CP length and the duration of the first reference time slot is $T_0$, which is determined based on the first value of subcarrier spacing and/or CP length. As shown in FIG. 8B, the first time position 810 may be at the end of the time slot p of the first communication and/or may be within the duration of time slot q of the second communication. The first time position is after the end of the first communication.

In FIG. 8C, the SCS for the first communication is larger than the SCS for the second communication and the first communication is finished within the duration of time slot p+1 of the first communication. As shown in FIG. 8C, the first time position 810 may be at the end of the time slot p+1 of the first communication and/or may be within the duration of the time slot q of the second communication. The first time position is after the end of the first communication.

In some embodiments, the first time position may be the position of the starting or ending of a time slot which is after the end of the first communication and/or the starting of the counting for number of symbols/slots/mini-slots for the second communication. The time duration may be time duration of slot(s)/symbol(s)/mini-slot(s) based on a reference value of subcarrier spacing and/or CP length. In some embodiments, the first time position may be the starting of the earliest time slot which is after the first communication, and the time duration may be based on a reference value of subcarrier spacing and/or CP length. In some embodiments, the reference value of subcarrier spacing and/or CP length may be configured by the network device. For example, the configuration information may be transmitted in at least one of the physical signaling, PDCCH, Radio Resource Control (RRC) signaling, Medium Access Control (MAC) signaling, and so on. In some embodiments, a fixed reference value of subcarrier spacing and/or CP length may be predefined with the combination of different values of subcarrier spacing and/or CP length for the first and second communication.

FIGS. 9A-9D illustrate determining a first position 910 associated with a first communication according to an example embodiment of the disclosure, where the first reference is different from the first numerology used by the first communication or the second used by the second communication. That is, the value of subcarrier spacing and/or CP length of the first reference numerology are the different from the value of subcarrier spacing and/or minimum CP length of the first numerology and the value of subcarrier spacing and/or minimum CP length of the second numerology.

By way of example, as shown in FIGS. 9A-9D, the first communication uses a first value of subcarrier spacing and/or CP length, for example, the SCS for the first communication is $S_0$ kHz. The first reference communication uses a first reference value of subcarrier spacing and/or CP length, for example, the SCS for the first reference communication is $S_r$ kHz. Therefore, in FIGS. 9A-9D, the duration of the first reference time slot is $T_r$, which is determined based on the first reference value of subcarrier spacing and/or CP length. The first time position 910 is determined based on the duration $T_r$ of the first reference time slot (in this embodiment, m, m+1, . . . , m+s) and an index N of the first reference time slot. In some embodiments, when the method 400 is implemented by the terminal device 320, the index of the first reference time slot is obtained from a message transmitted from the network device 330. In some embodiments, when the method 400 is implemented by the terminal device 320, the first value of subcarrier spacing and/or CP length of the first communication, the second value of subcarrier spacing and/or CP length of the second communication and/or the first reference value of subcarrier spacing and/or CP length of the first reference time slot are configured by the network device 330. In some embodiments, the first reference value of subcarrier spacing and/or CP length of the first reference time slot may be predefined with the combination of different values of subcarrier spacing and/or CP length for the first and second communication. That is, there may be no definition of the first reference value of subcarrier spacing and/or CP length for the first reference time slot.

Figure 9A:
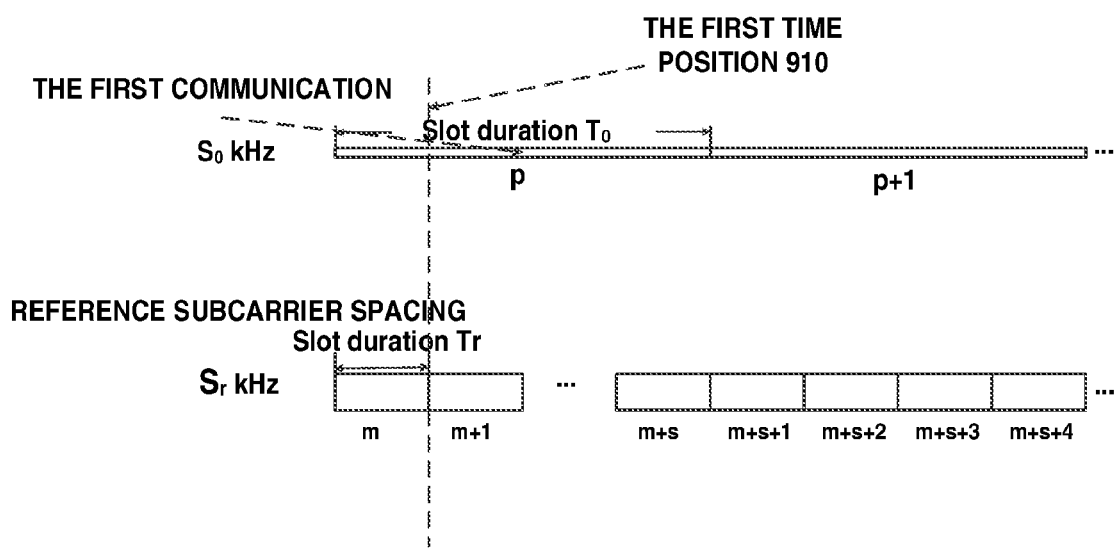
FIGS. 9A-9D illustrate determining a first position 910 associated with a first communication according to an example embodiment of the disclosure, where the first reference numerology is different from the first numerology used by the first communication or the second numerology used by the second communication.

In FIG. 9A, the SCS for the first communication is smaller than the SCS for the first reference communication. As shown in FIG. 9A, the first time position 910 is within the time slot p of the first communication and/or may be at the end of the time slot m of the first reference communication. The first time position is after the end of the first communication.

Figure 9B:
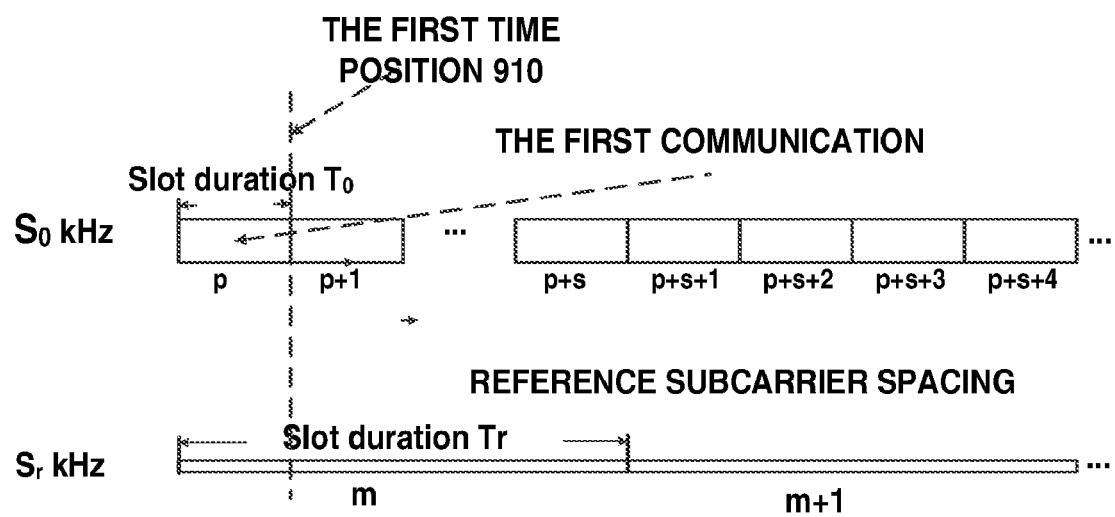

In FIG. 9B, the SCS for the first communication is larger than the SCS for the first reference communication and the first communication is finished within the duration of time slot p of the first communication. As shown in FIG. 9B, the first time position 910 may be at the end of the time slot p+s of the first communication and/or may be at the end of the time slot q of the first reference communication. The first time position is after the end of the first communication.

Figure 9C:
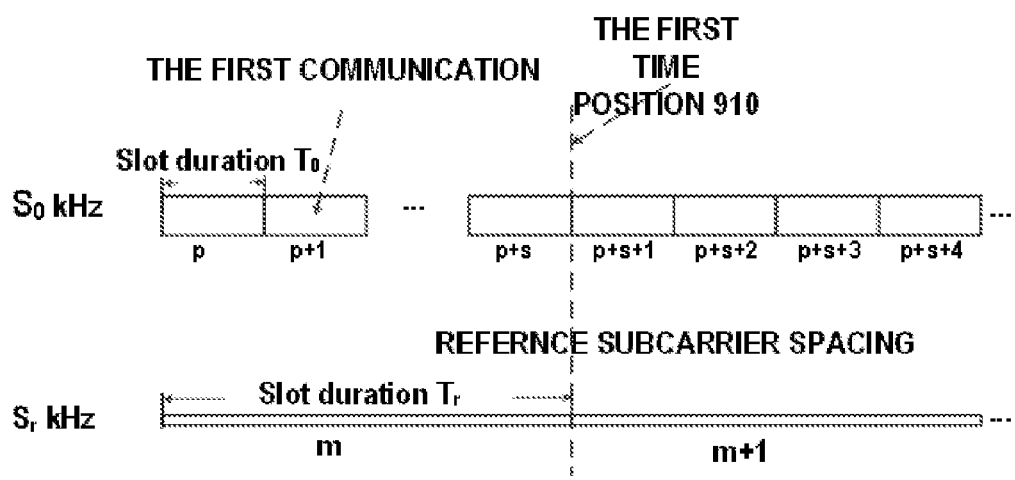

In FIG. 9C, the SCS for the first communication is larger than the SCS for the first reference communication and the first communication is finished within the duration of time slot p+1 of the first communication. As shown in FIG. 9C, the first time position 910 may be at the end of the time slot p+s of the first communication and/or may be at the end of the time slot q of the first reference communication. The first time position is after the end of the first communication.

Figure 9D:
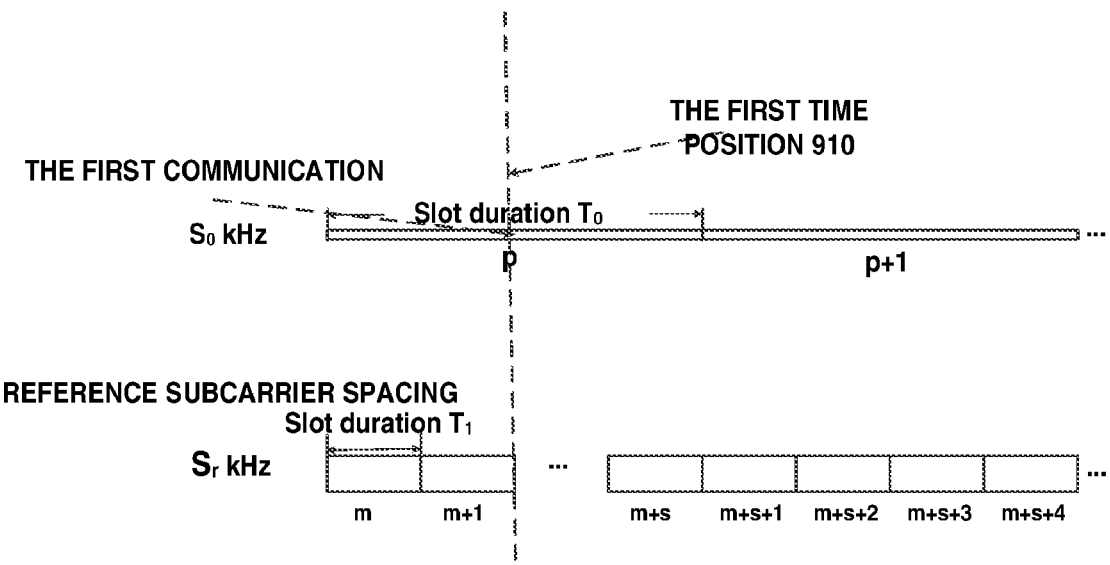

In FIG. 9D, the SCS for the first communication is smaller than the SCS for the first reference communication and the first communication is finished within the duration of time slot m+1 of the first reference communication. As shown in FIG. 9D, the first time position 910 may be at the starting of the first time slot m+2 of the first reference communication after the first communication is finished. The first time position 910 may also be at the end of the time slot m+1 where the first communication is finished. The first time position is after the end of the first communication.

In some embodiments, the method 400 further includes: determining a duration of a second reference time slot based on a second reference numerology; and determining the time interval based on the duration of the second reference time slot and the number of the second reference time slots.

Figure 10:
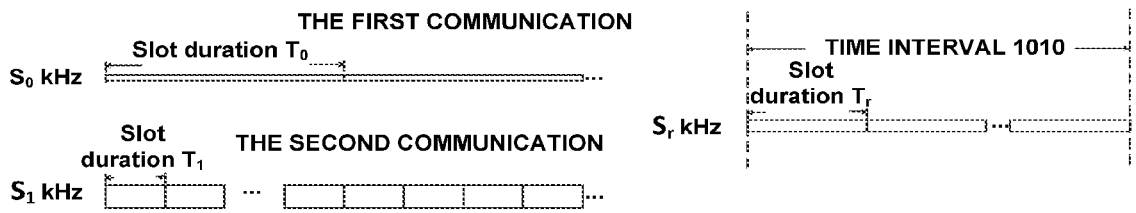
FIG. 10 illustrates determining the time interval 1010 between the first communication and the second communication.

FIG. 10 illustrates determining the time interval 1010 between the first communication and the second communication.

By way of example, as shown in FIG. 10, the first communication uses a first value of subcarrier spacing and/or CP length, for example, the SCS for the first communication is $S_0$ kHz. The second communication uses a second value of subcarrier spacing and/or CP length, for example, the SCS for the second communication is $S_1$ kHz. The duration of the second reference time slot is Ts which may be determined based on a second reference value of subcarrier spacing and/or CP length. The time interval 1010 may be determined based on the duration of the second reference time slot Ts and the number K of the second reference time slots. In some embodiments, when the method 400 is implemented by the terminal device 320, the number of the second reference time slot is obtained from a message transmitted from the network device 330. In some embodiments, when the method 400 is implemented by the terminal device 320, the first value of subcarrier spacing and/or CP length of the first communication, the second value of subcarrier spacing and/or CP length of the second communication and/or the second reference value of subcarrier spacing and/or CP length of the second reference time slot are configured by the network device 330.

In some embodiments, the value of subcarrier spacing and/or CP length of the second reference time slot may be the same as the value of subcarrier spacing and/or CP length configured for the first communication. That is, there may be no definition of the second reference value of subcarrier spacing and/or CP length for the second reference time slot.

In some embodiments, the value of subcarrier spacing and/or CP length of the second reference time slot may be the same as the value of subcarrier spacing and/or CP length configured for the second communication. That is, there may be no definition of the second reference value of subcarrier spacing and/or CP length for the second reference time slot.

In some embodiments, the value of subcarrier spacing and/or CP length of the second reference time slot may be the same as the maximum value of subcarrier spacing and/or CP length between the first value of subcarrier spacing and/or CP length used by the first communication and the second value of subcarrier spacing and/or CP length used by the second communication. That is, there may be no definition of the second reference value of subcarrier spacing and/or CP length for the second reference time slot.

In some embodiments, the value of subcarrier spacing and/or CP length of the second reference time slot may be the same as the minimum value of subcarrier spacing and/or CP length between the first value of subcarrier spacing and/or CP length used by the first communication and the second value of subcarrier spacing and/or CP length used by the second communication. That is, there may be no definition of the second reference value of subcarrier spacing and/or CP length for the second reference time slot.

In some embodiments, the value of subcarrier spacing and/or CP length of the second reference time slot may be predefined with the combination of different values of subcarrier spacing and/or CP length for the first and second communication. That is, there may be no definition of the second reference value of subcarrier spacing and/or CP length for the second reference time slot.

In some embodiments, the value of subcarrier spacing and/or CP length of the second reference time slot may be configured by the network device. With the combination of different values of subcarrier spacing and/or CP length for the first and second communication. That is, there may be no definition of the second reference value of subcarrier spacing and/or CP length for the second reference time slot.

In some embodiments, the value of subcarrier spacing and/or CP length may be configured by the network device. For example, the configuration information may be transmitted in at least one of the physical signaling, PDCCH, Radio Resource Control (RRC) signaling, Medium Access Control (MAC) signaling, and so on.

In an embodiment, the duration of the second reference time slot may be the same as the duration of the first time slot of the first communication. In an embodiment, the duration of the second reference time slot may be the same as the duration of the second time slot of the second communication. In an embodiment, the duration of the second reference time slot may be the same as the larger duration between the duration of the first communication and the second communication. In an embodiment, the duration of the second referent time slot may be the same as the smaller duration between the duration of the first communication and the second communication.

In some embodiments, the method 400 further includes: determining, based on the first time position and the time interval, a second time position associated with the second communication.

The first position may be determined using any one of the methods described herein. The time interval may be determined using any one of the methods described herein.

Figure 11A:
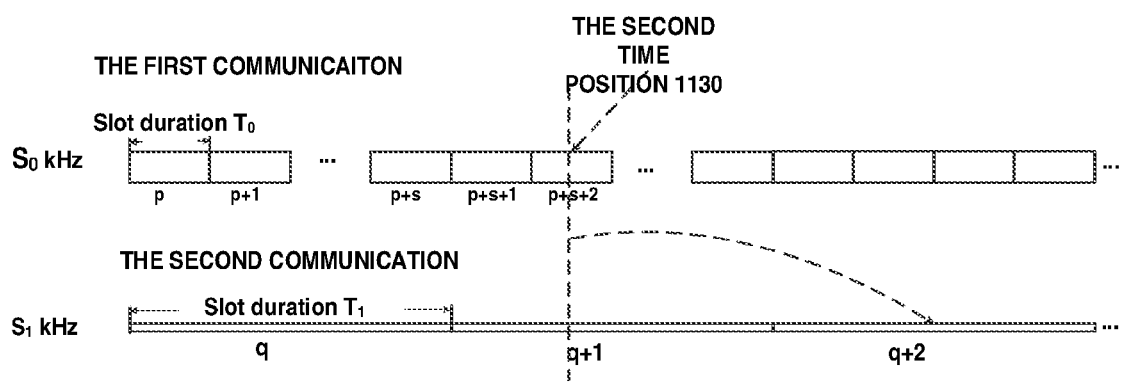
FIGS. 11A-11B illustrate determining a second time position 1130 associated with the second communication based on the first time position 1110 and the time interval 1120, according to an example embodiment of the disclosure.
Figure 11B:
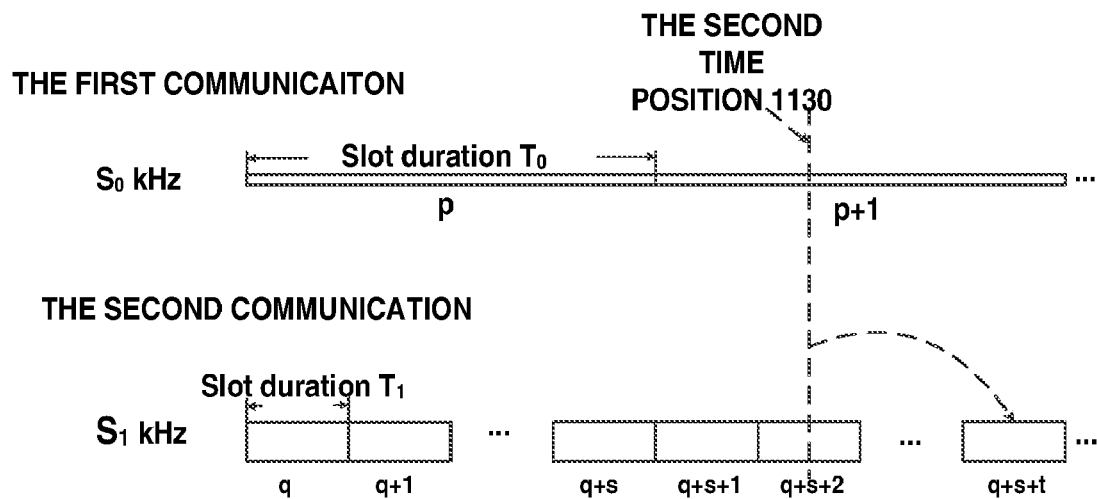

FIGS. 11A-11B illustrate determining a second time position 1130 associated with the second communication based on the first time position 1110 and the time interval 1120, according to an example embodiment of the disclosure. In FIG. 11A, the duration of the first time slot $T_0$ is smaller than the duration of the second time slot $T_1$. The second position 1130 is neither at an end of a time slot of the second communication nor at the beginning of a time slot of the second communication. In such situation, the second communication can be delayed to next whole time slot configured for the second communication or can be dropped. In FIG. 11B, the duration of the first time slot $T_0$ is larger than the duration of the second time slot $T_1$. The second position 1130 is not available for the second communication. In such situation, the second communication can be delayed to next whole time slot configured for the second communication or can be dropped.

Figure 12A:
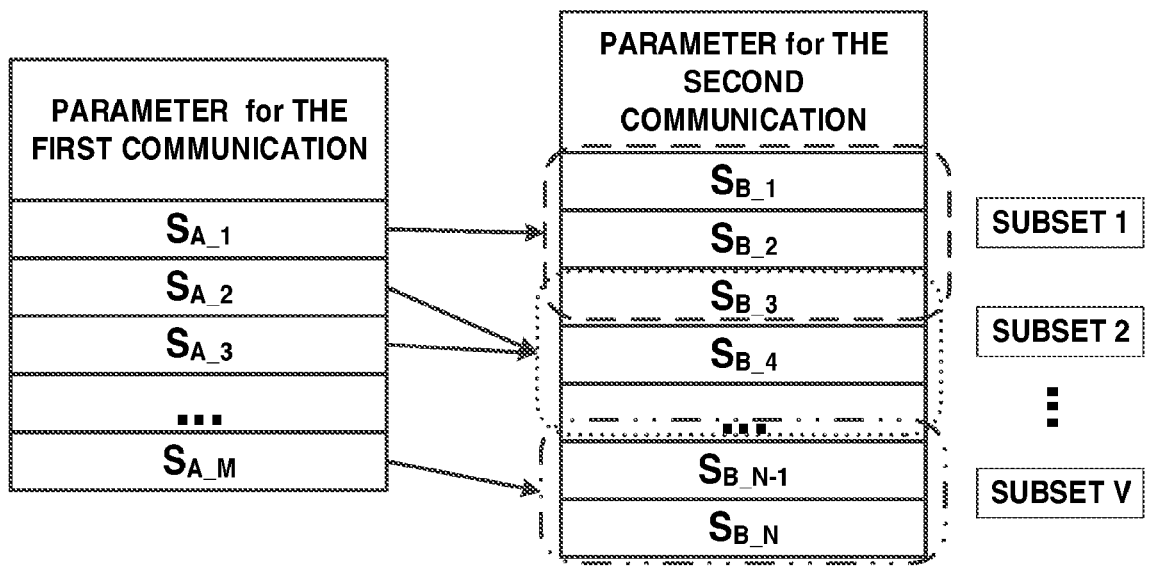
FIG. 12A-12C show the SCS combination restrictions between the first communication and the second communication.
Figure 12B:
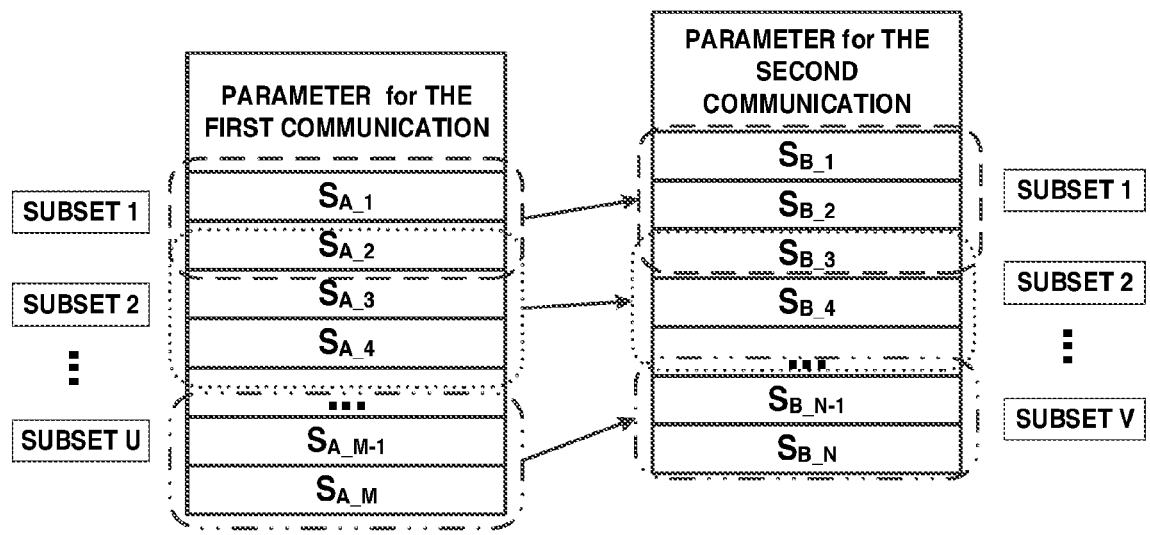

FIG. 12A-12B shows the SCS combination restrictions between the first communication and the second communication. In some embodiments according to the disclosure, the first communication and the second communication may be one of: downlink control information for downlink data assignment and downlink transmission of data, downlink control information for uplink data assignment and uplink transmission of data, downlink transmission of data and acknowledgement for the downlink transmission of data, and random access transmission and response for the random access channel information transmission. The first communication may be configured with parameters, for example, SCS values and/or cyclic prefix (CP) length. In an embodiment, there may be a set of values of SCS for the first communication, for instance, $\{S_{A\_1}$ kHz, $S_{A\_2}$ kHz, ..., $S_{A\_M}$ kHz$\}$. M is an integer and is not smaller than 1. In an embodiment, for uplink and/or downlink control and/or data transmission, the SCS may be at least one of: 15 kHz, 30 kHz, 60 kHz, 120 kHz, 240 kHz, 480 kHz, and 3.75 kHz. In an embodiment, for PRACH transmission, the SCS may be at least one of: 1.25 kHz, 5 kHz, 15 kHz, 30 kHz, 60 kHz, 120 kHz, 2.5 kHz, and 7.5 kHz. In an embodiment, there may be a set of values of CP length for the first communication, for example, $\{L_{A\_1}, L_{A\_2}, \ldots, L_{A\_M}\}$. M is an integer and is not smaller than 1. For example, there may be normal CP and extended CP for the first communication.

In an embodiment, the second communication may be configured with parameters, for example, SCS values and/or cyclic prefix (CP) length. In an embodiment, there may be a set of values of SCS for the second communication, for instance, $\{S_{B\_1}$ kHz, $S_{B\_2}$ kHz, ..., $S_{B\_N}$ kHz$\}$. N is an integer and is not smaller than 1. In an embodiment, for downlink and/or uplink control and/or data transmission, the SCS may be at least one of: 15 kHz, 30 kHz, 60 kHz, 120 kHz, 240 kHz, 480 kHz, and 3.75 kHz. In an embodiment, for PRACH transmission, the SCS may be at least one of: 1.25 kHz, 5 kHz, 15 kHz, 30 kHz, 60 kHz, 120 kHz, 2.5 kHz, and 7.5 kHz. In an embodiment, there may be a set of values of CP length for the second communication, for example, $\{L_{B\_1}, L_{B\_2}, \ldots, L_{B\_N}\}$. N is an integer and is not smaller than 1. For example, there may be normal CP and extended CP for the second communication.

In an embodiment, as shown in FIG. 12A, the parameters for the second communication or reference parameters (for example, reference value of subcarrier spacing) may be divided into V groups. The size of each group may be same or different with each other and the values in each group may be partially/totally overlapped/non-overlapped with each other. For the first communication, for each value in the set of parameters, the parameters for corresponding second communication or reference parameters may be restricted or fixed to a subset of values. Specifically, each value in the set of parameters for the first communication, there is one fixed value for the corresponding second communication or reference parameters. For example, a same CP type should be configured for the first communication and the corresponding second communication. That is to say, if a normal CP is configured for the first communication, the normal CP is configured for the second communication. For another example, a same value of subcarrier spacing should be configured for the first communication and the corresponding second communication.

In an embodiment, as shown in FIG. 12B, for the first communication, the set of parameters may be divided into U groups. The size of each group may be same or different with each other and the values in each group may be partially/totally overlapped/non-overlapped with each other. The parameters for the second communication or reference parameters may be divided into V groups. The size of each group may be same or different with each other, and the values in each group may be partially/totally overlapped/non-overlapped with each other. For the first communication, for each subset of parameters, the parameters for the corresponding second communication or reference parameters may be restricted or fixed to a subset of values.

Figure 12C:
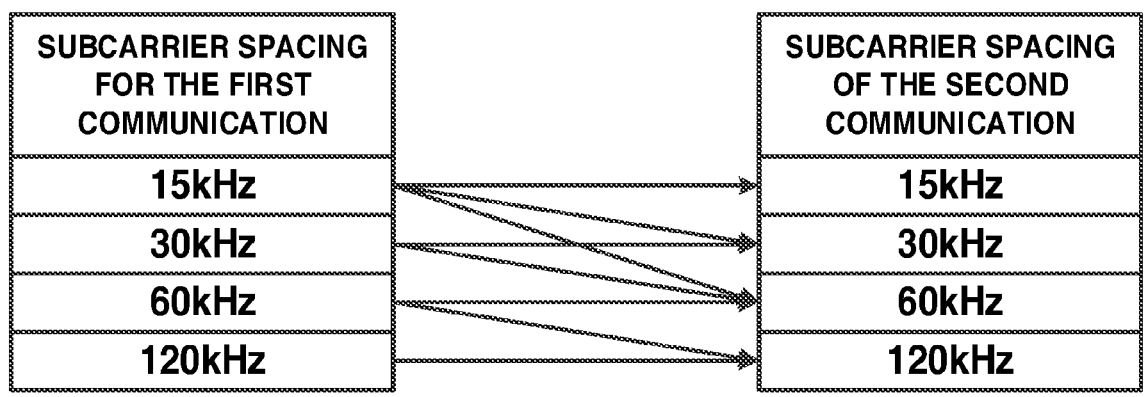

In an embodiment, as shown in FIG. 12C, the set of subcarrier spacing for DL assignment, or UL assignment, or DL data reception may be {15 kHz, 30 kHz, 60 kHz, 120 kHz}. In an embodiment, the subset of {15 kHz, 30 kHz, 60 kHz, 120 kHz} may be configured for corresponding DL data or UL data or acknowledgement.

In an embodiment, when the SCS for the first communication is 15 kHz, the second communication may be configured with the subset of SCS of {15 kHz, 30 kHz, 60 kHz}. In an embodiment, when the SCS for the first communication is 30 kHz, the second communication may be configured with the subset of SCS of {15 kHz, 30 kHz, 60 kHz}. In an embodiment, when the SCS for the first communication is 60 kHz, the second communication may be configured with the subset of SCS of {15 kHz, 30 kHz, 60 kHz, 120 kHz}. In an embodiment, when the SCS for the first communication is 120 kHz, the second communication may be configured with the subset of SCS of {60 kHz, 120 kHz}.

In an embodiment, the subcarrier spacing for corresponding DL data or UL data or acknowledgement may be no smaller than that for DL assignment, or UL assignment, or DL data reception.

In an embodiment, when the SCS for the first communication is 15 kHz, the second communication may be configured with the subset of SCS of {15 kHz, 30 kHz, 60 kHz}. In an embodiment, when the SCS for the first communication is 30 kHz, the second communication may be configured with the subset of SCS of {30 kHz, 60 kHz}. In an embodiment, when the SCS for the first communication is 60 kHz, the second communication may be configured with the subset of SCS of {60 kHz, 120 kHz}. In an embodiment, when the SCS for the first communication is 120 kHz, the second communication may be configured with the subset of SCS of {120 kHz}.

For PRACH transmission and corresponding random access response (RAR). Subcarrier spacing for PRACH may be {1.25 kHz, 5 kHz, 15 kHz, 30 kHz, 60 kHz, 120 kHz, 2.5 kHz, 7.5 kHz}. Subcarrier spacing configured for RAR may be {15 kHz, 30 kHz, 60 kHz, 120 kHz}. In an embodiment, when the first communication is PRACH and the second communication is RAR, the second communication may be configured with the subset of {15 kHz, 30 kHz, 60 kHz, 120 kHz}. In an embodiment, when the SCS for PRACH is 1.25 kHz, the RAR may be configured with the subset of SCS of {15 kHz, 30 kHz}. In an embodiment, when the SCS for PRACH is 5 kHz, the RAR may be configured with the subset of SCS of {15 kHz, 30 kHz}. In an embodiment, when the SCS for PRACH is 15 kHz, the RAR may be configured with the subset of SCS of {15 kHz, 30 kHz}. In an embodiment, when the SCS for PRACH is 30 kHz, the RAR may be configured with the subset of SCS of {15 kHz, 30 kHz, 60 kHz}. In an embodiment, when the SCS for PRACH is 60 kHz, the RAR may be configured with the subset of SCS of {15 kHz, 30 kHz, 60 kHz, 120 kHz}. In an embodiment, when the SCS for PRACH is 120 kHz, the RAR may be configured with the subset of SCS of {60 kHz, 120 kHz}.

In an embodiment, the subcarrier spacing for RAR may be no smaller than that for PRACH. In an embodiment, when the subcarrier spacing for PRACH is 1.25 kHz, the RAR may be configured with the subset of SCS of {15 kHz, 30 kHz}. In an embodiment, when the subcarrier spacing for PRACH is 5 kHz, the RAR may be configured with the subset of SCS of {15 kHz, 30 kHz}. In an embodiment, when the subcarrier spacing for PRACH is 15 kHz, the RAR may be configured with the subset of SCS of {15 kHz, 30 kHz}. In an embodiment, when the subcarrier spacing for PRACH is 30 kHz, the RAR may be configured with the subset of SCS of {30 kHz, 60 kHz}. In an embodiment, when the subcarrier spacing for PRACH is 60 kHz, the RAR may be configured with the subset of SCS of {60 kHz, 120 kHz. In an embodiment, when the subcarrier spacing for PRACH is 120 kHz, the RAR may be configured with the subset of SCS of {120 kHz}. Specifically, each value of subcarrier spacing in the set of parameters for the PRACH transmission, there is one fixed value of subcarrier spacing for the corresponding RAR transmission.

In some embodiments, a time interval may be configured between the first communication and a second communication. The time interval may be configured based on an integer number of slot(s)/symbol(s)/mini-slot(s), for example, the number may be K. In some embodiments, the value(s) K may be a set of integers. In some embodiments, for different values of subcarrier spacing and/or CP length configured for the first and/or second communication, the value(s) or number of integers in the set for K may be different, the first communication using a first numerology, the second communication using a second numerology and being performed in response to the first communication. FIGS. 13-16 illustrate some example interactions between the network device 330 and the terminal device 320. Those skilled in the art would appreciate that method 400 may be implemented in the network device 330 and the terminal device 320 shown in FIGS. 13-16 and the embodiments described with reference to FIGS. 5A-5C, FIGS. 6A-6D. FIGS. 7a-7C, FIG. 8A-8C, FIGS. 9A-9D and FIG. 10 may also be implemented in n the network device 330 and the terminal device 320 shown in FIGS. 13-16.

Figure 13:
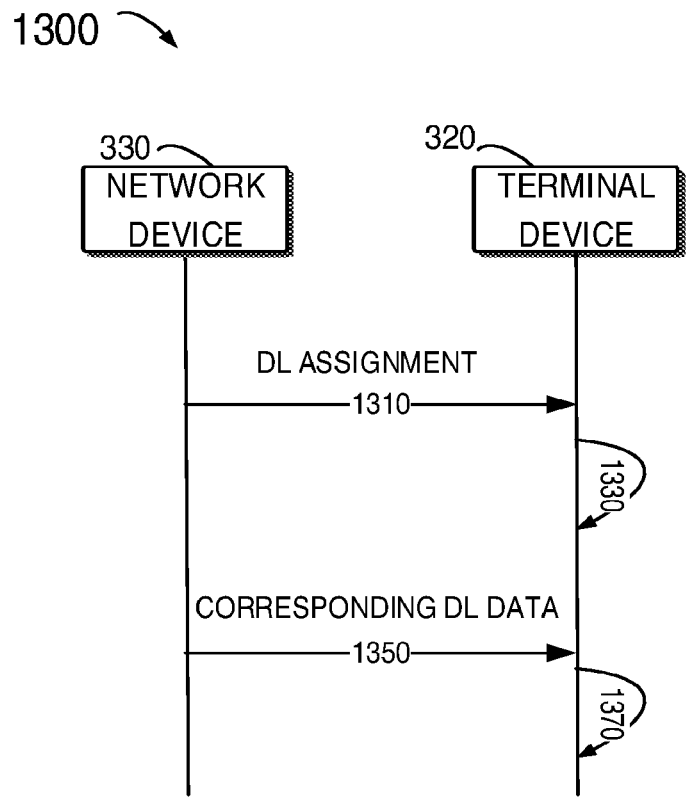
FIG. 13 illustrates an example interaction 1300 between the network device 330 and the terminal device 320.

In an embodiment, as shown in FIG. 13, the network device 330 may transmit 1310 DL assignment (corresponding to "a first communication" in interaction 1300) to the terminal device 320 and then the network device 330 may transmit 1350 the corresponding DL data to the terminal device 320 after a time interval. In an embodiment, the terminal device 320 may determine the first time position associated with the DL assignment and/or the time interval between the DL assignment and the corresponding DL data (corresponding to "a second communication" in interaction 1300). In an embodiment, the network device 330 may configure scheduling information and/or higher layer signaling to the terminal device 320 for DL data transmission. In an embodiment, the terminal device 320 may receive and decode 1330 the assignment information and receive and decode 1370 the corresponding DL data based on the assignment information. The scheduling information may include at least one of resource allocation, modulation and coding scheme, bandwidth part, frequency carrier information, values of subcarrier spacing, length of cyclic prefix (CP), relationship between DL assignment and corresponding downlink data transmission (e.g. k slots and/or mini-slots and/or symbols, DL assignment in slot/mini-slot/symbol n and corresponding DL data in slot/mini-slot/symbol n+k), hybrid automatic repeat request (HARD) information, redundant version, power information and etc. There may be a set of values k for the information of relationship between DL assignment and corresponding downlink data transmission. For different frequency carrier and/or bandwidth part and/or subcarrier spacing values, and/or CP lengths, the set of values k may be different.

Figure 14:
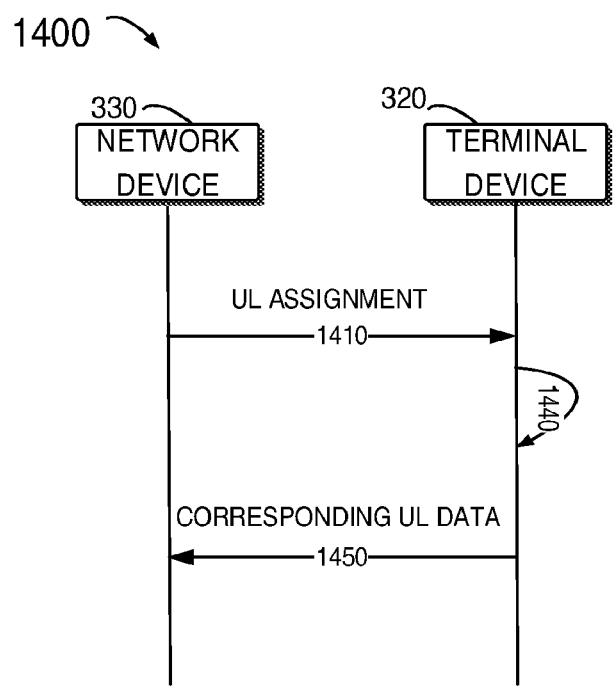
FIG. 14 illustrates an example interaction 1400 between the network device 330 and the terminal device 320.

In an embodiment, as shown in FIG. 14, the network device 330 may transmit 1410 UL assignment (corresponding to "a first communication" in interaction 1400) to the terminal device 320 and then the terminal device 320 may transmit 1450 the corresponding UL data to the network device 330. In an embodiment, the terminal device 320 may determine the first time position associated with the UL assignment and/or the time interval between the UL assignment and the corresponding UL data (corresponding to "a second communication" in interaction 1400). In an embodiment, the network device 330 may configure scheduling information and/or higher layer signaling to the terminal device 320 for UL data (PUSCH) transmission. In an embodiment, the terminal device 320 may receive and decode 1440 the UL assignment information. The scheduling information may include at least one of resource allocation, modulation and coding scheme, bandwidth part, frequency carrier information, values of subcarrier spacing, length of cyclic prefix (CP), relationship between UL assignment and corresponding uplink data transmission (e.g. k slots and/or mini-slots and/or symbols, UL assignment in slot/mini-slot/symbol n and corresponding UL data in slot/mini-slot/symbol n+k), hybrid automatic repeat request (HARQ) information, redundant version, power information and etc. There may be a set of values k for the information of relationship between UL assignment and corresponding downlink data transmission. For different frequency carrier and/or bandwidth part and/or subcarrier spacing values, and/or CP lengths, the set of values k may be different.

Figure 15:
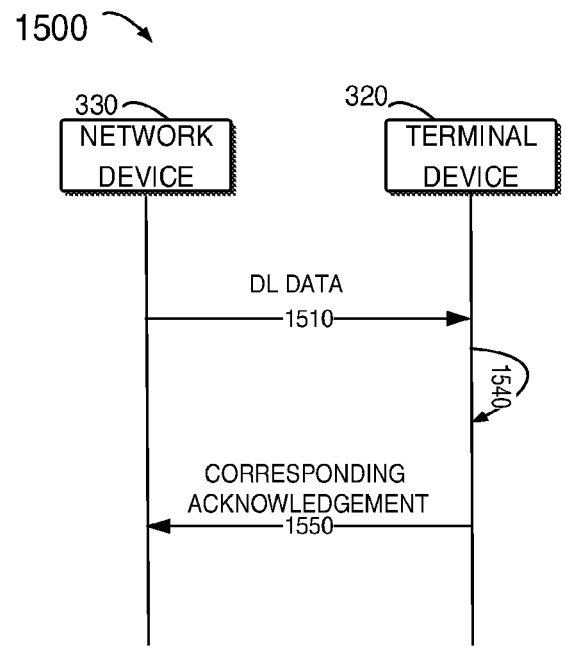
FIG. 15 illustrates an example interaction 1500 between the network device 330 and the terminal device 320.

In an embodiment, as shown in FIG. 15, the network device 330 may transmit 1510 DL data (corresponding to "a first communication" in interaction 1500) to the terminal device 320 and then the terminal device 320 may transmit 1550 the corresponding acknowledgement to the network device 330. In an embodiment, the terminal device 320 may determine the first time position associated with the DL data and/or the time interval between the DL data and the corresponding acknowledgment (corresponding to "a second communication" in interaction 1500). In an embodiment, the network device 330 may configure scheduling information and/or higher layer signaling to the terminal device 320 for acknowledgement (PUCCH) transmission. In an embodiment, the terminal device 320 may receive and decode 1540 the DL data. The scheduling information may include at least one of resource allocation, modulation and coding scheme, bandwidth part, frequency carrier information, values of subcarrier spacing, length of cyclic prefix (CP), relationship between DL data and corresponding acknowledgement (e.g. k slots and/or mini-slots and/or symbols, UL assignment in slot/mini-slot/symbol n and corresponding UL data in slot/mini-slot/symbol n+k), hybrid automatic repeat request (HARQ) information, redundant version, power information and etc. There may be a set of values k for the information of relationship between DL data and corresponding acknowledgment. For different frequency carrier and/or bandwidth part and/or subcarrier spacing values, and/or CP lengths, the set of values k may be different.

Figure 16:
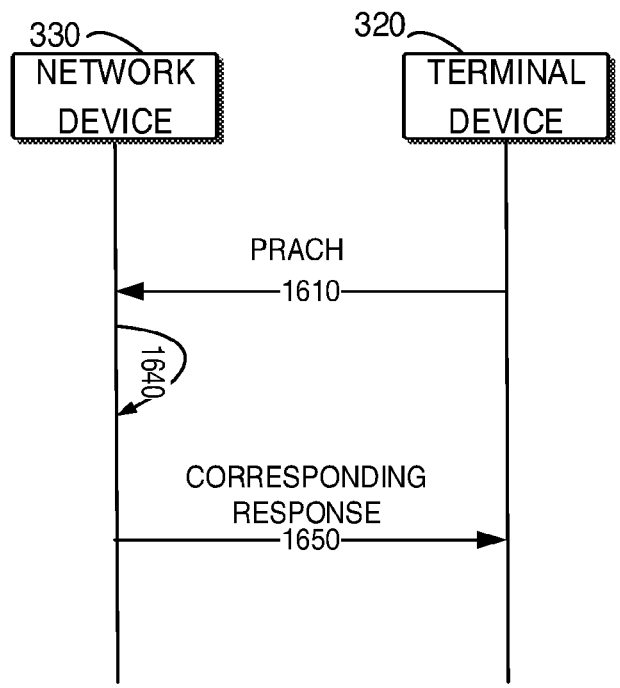
FIG. 16 illustrates an example interaction 1600 between the network device 330 and the terminal device 320.

In an embodiment, as shown in FIG. 16, the terminal device 320 may transmit 1610 PRACH (corresponding to "a first communication" in interaction 1600) to the network device 330 and then the network device 330 may transmit 1650 the corresponding response to the terminal device 320. In an embodiment, the network device 330 may determine the first time position associated with the PRACH and/or the time interval between the PRACH and the corresponding response (corresponding to "a second communication" in interaction 1600). In an embodiment, the network device 330 may configure some information and/or higher layer signaling to the terminal device 320 for PRACH transmission. In an embodiment, the network device 330 may receive and detect 1640 the PRACH. The information may include at least one of resource allocation, bandwidth part, frequency carrier information, values of subcarrier spacing, length of cyclic prefix (CP), relationship between PRACH transmission and corresponding response (e.g. k slots and/or mini-slots and/or symbols, PRACH transmission in slot/mini-slot/symbol n and corresponding response from slot/mini-slot/symbol n+k), power information and etc. There may be a set of values k for the information of relationship between PRACH transmission and corresponding response. For different frequency carrier and/or bandwidth part and/or subcarrier spacing values, and/or CP lengths, the set of values k may be different. In an embodiment, the network device 330 may configure information for the corresponding response (e.g. RAR and/or PDCCH) and the information may include at least one of time and/or frequency resource, time window for detection, subcarrier spacing value, CP length. In an embodiment, the corresponding response may be scheduled by PDCCH.

Figure 17:
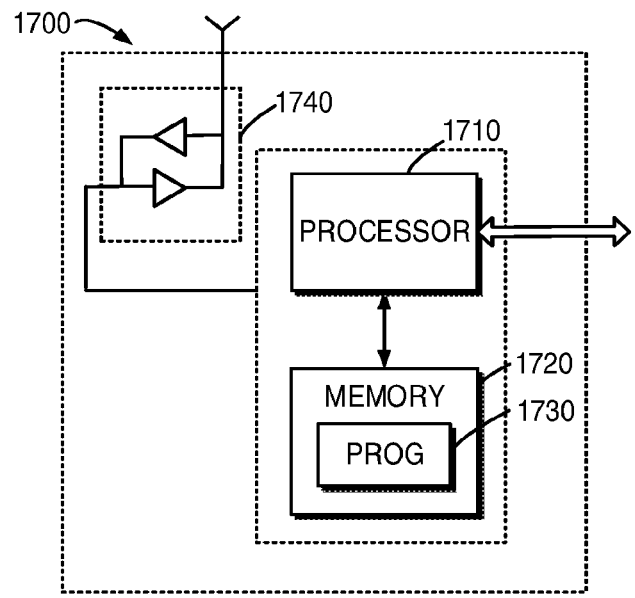
FIG. 17 is a simplified block diagram of a device 1700 that is suitable for implementing embodiments of the present disclosure.

FIG. 17 is a simplified block diagram of a device 1700 that is suitable for implementing embodiments of the present disclosure. As shown, the device 1700 includes one or more processors 1710, one or more memories 1720 coupled to the processor(s) 1710, one or more transmitters and/or receivers (TX/RX) 1740 coupled to the processor 1710. The device 1700 may be implemented as the network device 330 and the terminal device 320.

The processor 1710 may be of any type suitable to the local technical network, and may include one or more of general purpose computers, special purpose computers, microprocessors, digital signal processors (DSPs) and processors based on multicore processor architecture, as non-limiting examples. The device 1700 may have multiple processors, such as an application specific integrated circuit chip that is slaved in time to a clock which synchronizes the main processor.

The memory 1720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 1720 stores at least a part of a program 1730. The TX/RX 1740 is for bidirectional communications. The TX/RX 1740 has at least one antenna to facilitate communication, though in practice an Access Node mentioned in this application may have several ones. The communication interface may represent any interface that is necessary for communication with other network elements.

The program 1730 is assumed to include program instructions that, when executed by the associated processor 1710, enable the device 1700 to operate in accordance with the embodiments of the present disclosure, as discussed herein with reference to FIGS. 5 to 10. That is, embodiments of the present disclosure can be implemented by computer software executable by the processor 1710 of the device 1700, or by hardware, or by a combination of software and hardware.

Figure 18:
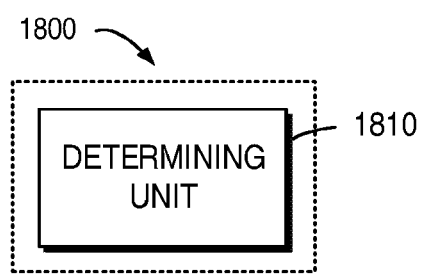
FIG. 18 is a simplified block diagram of an apparatus 1800 that is suitable for implementing embodiments of the present disclosure.

FIG. 18 is a simplified block diagram of an apparatus 1800 that is suitable for implementing embodiments of the present disclosure. The apparatus 1800 may be implemented at the network device 330 and the terminal device 320. As shown, the apparatus 1800 include a determining unit 1810 which is configured to determine at least one of a first time position associated with a first communication and a time interval between the first communication and a second communication, the first communication using a first numerology, the second communication using a second numerology and being performed in response to the first communication.

In an embodiment, the apparatus 1800 further include a second determining unit which is configured to determining, based on the first time position and the time interval, a second time position associated with the second communication.

In an embodiment, the determining unit 1810 is further configured to: determine a duration of a first reference time slot based on a first reference numerology; and determine the first time position based on the duration of the first reference time slot and an index of the first reference time slot.

In an embodiment, when the apparatus 1800 is a terminal device 320, the determining unit 1810 is further configured to: obtain the index of the first reference time slot from a message transmitted from a network device.

In an embodiment, the determining unit 1810 is further configured to determine a duration of a second reference time slot based on a second reference numerology; and determine the time interval based on the duration of the second reference time slot and the number of the second reference time slots.

In an embodiment, when the apparatus 1800 is a terminal device 320, the determining unit 1810 is further configured to: obtaining the number of the second reference time slots from a message transmitted from a network device.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 5 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a user equipment, the method comprising:
   receiving information indicating a number of slots k;
   receiving a PDSCH (Physical Downlink Shared Channel); and
   transmitting HARQ-ACK (Hybrid Automatic Repeat Request) information corresponding to the PDSCH, in a PUCCH (Physical Uplink Control Channel) transmission,
   wherein, if reception of the PDSCH is scheduled in a first slot of a first array of slots having a first subcarrier spacing, the PUCCH transmission is performed within a second slot of a second array of slots having a second subcarrier spacing,
   wherein, if the number of slots k equals 0, the second slot corresponds to a last slot, of the second array of slots having the second subcarrier spacing, that overlaps with the reception of the PDSCH,
   wherein, if the number of slots k is equal to or larger than 1, the second slot is positioned the number of slots k after the last slot, of the second array of slots having the second subcarrier spacing, that overlaps with the reception of the PDSCH, and
   wherein a number of slots per subframe depends on each value of the first subcarrier spacing and the second subcarrier spacing.

2. The method of claim 1, wherein the first subcarrier spacing is larger than the second subcarrier spacing.

3. The method of claim 1, wherein the second subcarrier spacing is larger than the first subcarrier spacing.

4. The method of claim 1, wherein the information indicating the number of slots k is indicated by dynamic control information, if present, or provided by higher layer signaling.

5. The method of claim 1, wherein number of symbols per slot is 14 if subcarrier spacing is 15 kHz, 30 kHz, 60 kHz, 120 kHz, and 240 kHz.

6. The method of claim 1, wherein duration of the subframe is 1 ms.

7. A method performed by a base station, the method comprising:
   transmitting information indicating a number of slots k;
   performing a transmission of a PDSCH (Physical Downlink Shared Channel); and
   receiving HARQ-ACK (Hybrid Automatic Repeat Request) information corresponding to the PDSCH, in a PUCCH (Physical Uplink Control Channel) transmission,
   wherein, if the transmission of the PDSCH is scheduled in a first slot of a first array of slots having a first subcarrier spacing, the PUCCH transmission is received within a second slot of a second array of slots having a second subcarrier spacing, the second slot being positioned the number of slots k after the first slot, the number of slots k being equal to or larger than 1,
   wherein, if the number of slots k equals 0, the second slot corresponds to a last slot, of the second array of slots having the second subcarrier spacing, that overlaps with the transmission of the PDSCH,
   wherein, if the number of slots k is equal to or larger than 1, the second slot is positioned the number of slots k after the last slot, of the second array of slots having the second subcarrier spacing, that overlaps with the transmission of the PDSCH, and
   wherein a number of slots per subframe depends on each value of the first subcarrier spacing and the second subcarrier spacing.

8. The method of claim 7, wherein the first subcarrier spacing is larger than the second subcarrier spacing.

9. The method of claim 7, wherein the second subcarrier spacing is larger than the first subcarrier spacing.

10. The method of claim 7, wherein the information indicating the number of slots k is indicated by dynamic control information, if present, or provided by higher layer signaling.

11. The method of claim 7, wherein number of symbols per slot is 14 if subcarrier spacing is 15 kHz, 30 kHz, 60 kHz, 120 kHz, and 240 kHz.

12. The method of claim 7, wherein duration of the subframe is 1 ms.

13. A user equipment comprising:
    at least one processor; and
    at least one memory connected to the at least one processor,
    wherein the at least one processor is configured to:
      receive information indicating a first number of slots k;
      receive a PDSCH (Physical Downlink Shared Channel); and
      transmit HARQ-ACK (Hybrid Automatic Repeat Request) information corresponding to the PDSCH, in a PUCCH (Physical Uplink Control Channel) transmission, wherein, if reception of the PDSCH is scheduled in a first slot of a first array of slots having a first subcarrier spacing, the PUCCH transmission is performed within a second slot of a second array of slots having a second subcarrier spacing, which is the which is the first number of slots after the first slot, wherein, if the number of slots k equals 0, the second slot corresponds to a last slot, of the second array of slots having the second subcarrier spacing, that overlaps with the reception of the PDSCH, wherein, if the number of slots k is equal to or larger than 1, the second slot is positioned the number of slots k after the last slot, of the second array of slots having the second subcarrier spacing, that overlaps with the reception of the PDSCH, and wherein a number of slots per subframe depends on each value of the first subcarrier spacing and the second subcarrier spacing.

14. The user equipment of claim 13, wherein the first subcarrier spacing is larger than the second subcarrier spacing.

15. The user equipment of claim 13, wherein the second subcarrier spacing is larger than the first subcarrier spacing.

* * * * *